(12) United States Patent
Fujimoto

(10) Patent No.: US 7,476,174 B2
(45) Date of Patent: Jan. 13, 2009

(54) ECCENTRIC OSCILLATING-TYPE PLANETARY GEAR DEVICE

(75) Inventor: Kenichi Fujimoto, Mie (JP)

(73) Assignee: Nabtesco Corporation, Tokyo (JP)

( * ) Notice: Subject to any disclaimer, the term of this patent is extended or adjusted under 35 U.S.C. 154(b) by 353 days.

(21) Appl. No.: 10/597,534

(22) PCT Filed: Jan. 28, 2005

(86) PCT No.: PCT/JP2005/001188

§ 371 (c)(1),
(2), (4) Date: Jul. 28, 2006

(87) PCT Pub. No.: WO2005/072067

PCT Pub. Date: Aug. 11, 2005

(65) Prior Publication Data

US 2008/0139357 A1   Jun. 12, 2008

(30) Foreign Application Priority Data

| Jan. 30, 2004 | (JP) | ............................. P2004-024887 |
| May 18, 2004 | (JP) | ............................. P2004-147352 |
| May 20, 2004 | (JP) | ............................. P2004-142505 |
| Jul. 26, 2004 | (JP) | ............................. P2004-217946 |

(51) Int. Cl.
  *F16H 1/32*   (2006.01)

(52) U.S. Cl. ................ 475/177; 475/162; 475/166; 475/168; 475/170; 475/178; 475/180

(58) Field of Classification Search ................ 475/162, 475/165, 166, 168, 169, 170, 176, 177, 178, 475/179, 180, 903, 904
See application file for complete search history.

(56) References Cited

U.S. PATENT DOCUMENTS

| 5,222,922 | A | | 6/1993 | Takahashi et al. |
| 5,322,485 | A | * | 6/1994 | Haga ............................ 475/178 |
| 5,472,384 | A | * | 12/1995 | Haga ............................ 475/162 |
| 6,231,469 | B1 | * | 5/2001 | Wang et al. .................. 475/178 |
| 6,918,572 | B2 | * | 7/2005 | Minegishi et al. ............. 254/248 |

FOREIGN PATENT DOCUMENTS

| JP | 57-23456 U | 2/1982 |
| JP | 02-261943 A | 10/1990 |
| JP | 05-44789 A | 2/1993 |
| JP | 07-299791 A | 11/1995 |

* cited by examiner

*Primary Examiner*—David D. Le
(74) *Attorney, Agent, or Firm*—Panitch Schwarze Belisario + Nadel LLP

(57) ABSTRACT

Elastic deformation of bridge portions in an externally toothed gear and external teeth is suppressed, and this extends the life of tooth surfaces of external teeth 19, improves vibration characteristics, and markedly increases output torque while preventing a planetary gear device 11 from becoming large in size.

12 Claims, 21 Drawing Sheets

ECCENTRIC OSCILLATING-TYPE PLANETARY GEAR DEVICE

CROSS-REFERENCE TO RELATED APPLICATIONS

This application is a Section 371 of International Application No. PCT/JP2005/001188, filed Jan. 28, 2005, which was published in the Japanese language on Aug. 11, 2005, under International Publication No. WO 2005/072067 A3 and the disclosure of which is incorporated herein by reference.

BACKGROUND OF THE INVENTION

The present invention relates to an eccentric oscillating-type planetary gear device that causes eccentric oscillation of an externally toothed gear meshed with an internally toothed gear by a crank shaft.

An eccentric oscillating-type planetary gear device, for example, one disclosed in Patent Document 1 is known.

The known eccentric oscillating-type planetary gear device includes an internally toothed gear, in which internal teeth having a plurality of rod-shaped pins on an inner periphery are provided by a constant pitch, an externally toothed gear, in which a plurality of crank shaft holes and through holes are formed and which has external teeth meshed with the internal teeth on an outer periphery, the external teeth having a trochoid tooth profile and being less than the internal teeth by one, a crank shaft that is inserted into each of the crank shaft holes and rotates to cause eccentric oscillation of the externally toothed gear, and a support body that rotatably supports the crank shaft and has a plurality of pillar portions respectively loosely fitted into the through holes.

In the known eccentric oscillating-type planetary gear device, as shown in FIG. 22, drive force components in a direction perpendicular to tooth surfaces are correspondingly given from external teeth 02 of an externally toothed gear 01 to internal teeth (pins) 04 of an internally toothed gear 03 at contact points where the externally toothed gear and the internally toothed gear are brought into contact with each other. Then, as the reaction, reaction force K of the drive force components are correspondingly given from the internal teeth (pins) 04 to the external teeth 02.

In addition, as shown in FIG. 23, action lines S of reaction force K of drive force components correspondingly given from the external teeth 101 to the internal teeth (pins) 102 meet at one meeting point C. The meeting point C is positioned between an outer end passing circle G passing radially outer ends of all through holes 103 and an inner end passing circle N passing radially inner ends of the through holes.

In such a planetary gear device, it is necessary to increase output torque without making the device large in size, in particular, without making the externally toothed gear large in diameter, and without increasing the drive force components (contact pressure) correspondingly given from the external teeth to the internal teeth.

Here, the output torque becomes the sum of values obtained by multiplying a tangential component of the drive force component at each of the contact points of the external teeth and the internal teeth (pins) by a distance from the center of the internally toothed gear to the contact point. However, the distance from the center of the internally toothed gear to the contact point is constant in order to prevent the device from becoming large in size. For this reason, in order to increase the output torque, an increase in the tangential component of the drive force component is taken into account. Then, the increase in the tangential component of the drive force component can be achieved by moving a meeting point where the action lines of the drive force components meet radially outward and by inclining the action lines toward a tangential direction with respect to the externally toothed gear.

Patent Document 1: JP-A-7-299791

In the above-described planetary gear device, however, the thickness of each of bridge portions 06 positioned radially outside the through hole 05 in the externally toothed gear 01 (a radial distance from the radially outer end of each of the through holes 05 to the tooth bottom 07 of each of the external teeth 02 becomes the minimum thickness) is slightly smaller than the thickness of other portion, and thus bending rigidity is low. Accordingly, the reaction force K described above is applied to the bridge portions 06 in an approximately radial direction, the bridge portions 06 and the external teeth 02 close to the bridge portions 06 are elastically deformed, and the external teeth 02 and the internal teeth (pins) 04 are unevenly meshed, which causes the short life of tooth surfaces of the external teeth 02.

Besides, as described above, if the bending rigidity of the bridge portions 06 is low, when a torque load exists in a case where the planetary gear device is applied to a robot, a machine tool, or the like, a natural vibration frequency is low, and thus vibration characteristics are degraded. In addition, controllability is decreased.

In such a known eccentric oscillating-type planetary gear device, as described above, since the meeting point C is positioned between the outer end passing circle G and the inner end passing circle N, with eccentric oscillation and rotation of the externally toothed gear 104, the meeting point C is positioned close to the center of the through hole 103. Then, the action lines S of the reaction force K extend in an approximately normal direction with respect to the through hole 103. Here, the bridge portions 105 positioned radially outside the through hole 103 in the externally toothed gear 104 are thinner than other portions, and thus rigidity is low. Then, a part of the reaction force K is applied to the bridge portions 105 having low rigidity in the approximately normal direction of the through hole 103, that is, in a direction approximately perpendicular to an extension direction of the bridge portions 105, as described above. Accordingly, the bridge portions 105 and the external teeth 101 close to the bridge portions 105 are elastically deformed, and the external teeth 101 and the internal teeth (pins) 102 are unevenly meshed, which causes the short life of the tooth surfaces of the external teeth 101.

The amount of eccentricity of the externally toothed gear to the internally toothed gear, which is obtained by dividing the position of the above-described meeting point (the radial distance from the center of the internally toothed gear) by the number of internal teeth (pins), needs to be less than 0.5 times the radius of each of the internal teeth (pins) in order to prevent the tooth tops of the external teeth from interfering with the inner periphery of the internally toothed gear (in the related art, about 0.40 to 0.45 times). As a result, as described above, the movement of the meeting point radially outward is limited, and the output torque cannot be sufficiently increased.

BRIEF SUMMARY OF THE INVENTION

An object of the invention is to provide an eccentric oscillating-type planetary gear device that can suppress elastic deformation of bridge portions and external teeth of an externally toothed gear so as to extend life of tooth surfaces of the external teeth, improve vibration characteristics, and increase output torque while preventing the device from being large in size.

In order to achieve the above-described objects, first, an eccentric oscillating-type planetary gear device includes an internally toothed gear, in which internal teeth having a plurality of rod-shaped pins on an inner periphery are provided by a constant pitch P, an externally toothed gear, in which at least one crank shaft hole and a plurality of through holes are formed and which has external teeth meshed with the internal teeth on an outer periphery, the external teeth having a trochoid tooth profile and being less than the internal teeth by one, a crank shaft that is inserted into the crank shaft hole and rotates to cause eccentric oscillation of the externally toothed gear, and a support body that rotatably supports the crank shaft and has a plurality of pillar portions respectively loosely fitted into the through holes. A ratio obtained by dividing the diameter D of each of the pins constituting the internal teeth by the constant pitch P of the internal teeth is made smaller to an extent where tooth tops of the external teeth are radially outside the inner periphery of the internally toothed gear, and portions of the external teeth that exceed at least the inner periphery of the internally toothed gear are cut, such that interference of the external teeth and the inner periphery of the internally toothed gear is prevented.

Second, in the same eccentric oscillating-type planetary gear device, a ratio obtained by dividing a diameter D of each of the pins constituting the internal teeth by the constant pitch P of the internal teeth is made smaller to an extent where tooth tops of the external teeth are radially outside the inner periphery of the internally toothed gear, and the inner periphery of the internally toothed gear between adjacent internal teeth is cut by a depth equal to or more than the amount of the external teeth exceeding the inner periphery, such that interference of the external teeth and the inner periphery of the internally toothed gear is prevented.

Third, an eccentric oscillating-type planetary gear device includes an internally toothed gear, in which internal teeth having a plurality of rod-shaped pins on an inner periphery are provided, an externally toothed gear, in which at least one crank shaft hole and a plurality of through holes are formed and which has a plurality of external teeth meshed with the internal teeth on an outer periphery, the external teeth having a trochoid tooth profile, a crank shaft that is inserted into the crank shaft hole and rotates to cause eccentric oscillation of the externally toothed gear, and a support body that rotatably supports the crank shaft and has a plurality of pillar portions respectively loosely fitted into the through holes. A meeting point C where actions lines S of reaction force K of drive force components correspondingly given from the external teeth to the internal teeth meet is positioned between a pin circle P passing the centers of all the pins constituting the internal teeth and an outer end passing circle G passing radially outer ends of all the through holes.

Fourth, an eccentric oscillating-type planetary gear device includes an internally toothed gear, in which internal teeth having a plurality of rod-shaped pins on an inner periphery are provided, an externally toothed gear, in which at least one crank shaft hole and a plurality of through holes are formed and which has external teeth meshed with the internal teeth on an outer periphery, the external teeth having a trochoid tooth profile and being less than the internal teeth by one, a crank shaft that is inserted into the crank shaft hole and rotates to cause eccentric oscillation of the externally toothed gear, and a support body that rotatably supports the crank shaft and has a plurality of pillar portions respectively loosely fitted into the through holes. When an amount of eccentricity of the externally toothed gear to the internally toothed gear is H and the radius of each of the pins constituting the internal teeth is R, the amount of eccentricity H is in a range of 0.5 to 1.0 times the radius R, and the external teeth are cut from the tooth tops by a predetermined amount, such that interference of the external teeth and the internal teeth of the internally toothed gear is prevented.

Fifth, in the same eccentric oscillating-type planetary gear device, when the amount of eccentricity of the externally toothed gear to the internally toothed gear is H and the radius of each of the pins constituting the internal teeth is R, the amount of eccentricity H is in a range of 0.5 to 1.0 times the radius R, and the inner periphery of the internally toothed gear between adjacent internal teeth is cut by a predetermined depth, such that interference of the external teeth and the internal teeth of the internally toothed gear is prevented.

In first and second aspects of the invention, the ratio obtained by dividing the diameter D of each of the pins constituting the internal teeth by the constant pitch P of the internal teeth is made smaller to an extent the tooth tops of the external teeth are radially outside the inner periphery of the internally toothed gear. Accordingly, the diameter D of each of the internal teeth (pins) becomes smaller compared with the related art, and thus tooth bottoms of the external teeth of the externally toothed gear are moved radially outward. As a result, the thickness (minimum thickness) of each of bridge portions positioned radially outside the through holes is thicker compared with the related art, and thus bending rigidity increases. Therefore, when reaction force of drive force components is applied in an approximately radial direction, elastic deformation in the bridge portions and the external teeth is suppressed, and thus the life of tooth surfaces of the external teeth extends. In addition, a natural vibration frequency increases, and thus vibration characteristics and controllability can be improved.

Here, with the above-described configuration, the external teeth interfere with the inner periphery of the externally toothed gear. However, according to the first aspect of the invention, at least the portions of the external teeth exceeding the inner periphery of the internally toothed gear are cut and, according to the second aspect of the invention, the inner periphery of the internally toothed gear between adjacent internal teeth is cut by the depth equal to or more than the amount of the external teeth exceeding the inner periphery, and thus the interference of the external teeth and the inner periphery of the internally toothed gear is prevented.

According to a third aspect of the invention, since an inflection point serving for maximum torque transmission remains, a decrease in transmitted torque can be suppressed. In addition, since portions where slipping of the external teeth of the internal teeth is little remain, noise and heat generation can be reduced.

According to a fourth aspect of the invention, Hertz stress at the contact points of the internal teeth and the external teeth can keep a low value, and thus the life of the tooth surfaces of the external teeth can more extend.

According to a fifth aspect of the invention, pointed portions can be prevented from occurring at the tooth surfaces, and an output torque can be increased.

According to a sixth aspect of the invention, the meeting point C where the actions lines S of the reaction force K of the drive force components correspondingly given from the external teeth to the internal teeth meet is positioned radially outside the outer end passing circle G passing the radially outer ends of all the through holes. Accordingly, when the meeting point C is positioned on the radial line passing the centers of the through holes, any action lines S of the reaction force K is inclined toward a tangential direction with respect to the through holes compared with the related art, and approach an extension direction of the bridge portions. As a result, elastic deformation of the thin bridge portions having low rigidity and the external teeth in the vicinities of the bridge portions is suppressed, and the life of the tooth surfaces of the external teeth extend.

As described above, if the meeting point C is positioned radially outside the outer end passing circle G, tangential components of the reaction force K are allowed to be received by the bridge portions having high tangential rigidity, not by cavity portions of the through holes, such that deformation of the through holes can be suppressed. However, if the meeting point C is positioned radially outside the pin circle P passing the centers of all the pins constituting the internal teeth, pointed portions at the tooth surfaces of the external teeth occur. Therefore, the meeting point C needs to be positioned between the outer end passing pin G and the pin circle P.

When the meeting point C is positioned between the pin circle P and a tooth bottom circle M, a part of the reaction force K extends in an approximately tangential direction with respect to the externally toothed gear. As a result, the external teeth may be bent and deformed due to the reaction force K. According to a seventh aspect of the invention, however, if the meeting point C is positioned between the tooth bottom circle M and the outer end passing circle G, the above problem can be prevented.

According to an eighth aspect of the invention, a high reduction ratio can be achieved compared with a case where a difference in the number of teeth is two or more, and processing costs can be reduced.

According to a ninth aspect of the invention, since the amount of eccentricity is 0.5 times or more the radius R, the radial distance L from the center O of the internally toothed gear to the meeting point C, which is obtained by multiplying the amount of eccentricity H by the number Z of internal teeth can be more moved compared with the related art, that is, the meeting point C can be moved more radially outward. Accordingly, the action lines S of the drive force components K' are steeply inclined toward the tangential direction with respect to the externally toothed gear, and thus the tangential components of the drive force components K' are increased. Therefore, when the numbers of meshed teeth of the internally toothed gear and the externally toothed gear are unchanged, the output torque increases.

As described above, if the amount H of eccentricity is not less than 0.5 times the radius R, the tooth tops of the external teeth interfere with the inner periphery of the internally toothed gear. However, since the external teeth are cut by a predetermined amount from the tooth tops, the interference of the internal teeth and the inner periphery of the internally toothed gear is prevented. Meanwhile, according to a tenth aspect of the invention, since the inner periphery of the internally toothed gear between adjacent internal teeth is cut by a predetermined depth, the interference of the external teeth and the inner periphery of the internally toothed gear is prevented. Moreover, if the amount H of eccentricity exceeds 1.0 times the radius R, in any cases described above, since a rotational position where the external teeth and the internal teeth interferes with each other upon eccentric oscillation and rotation of the externally toothed gear occurs, the amount H of eccentricity should be equal to or less than 1.0 times the radius R.

According to an eleventh aspect of the invention, the output torque can be markedly increased while pointed portions at the tooth surfaces are prevented from occurring.

According to a twelfth aspect of the invention, bending rigidity of the external teeth can be increased, and processing of the external teeth can be easily performed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

First Embodiment

A first embodiment of the invention will now be described with reference to the drawings.

Figure 1:
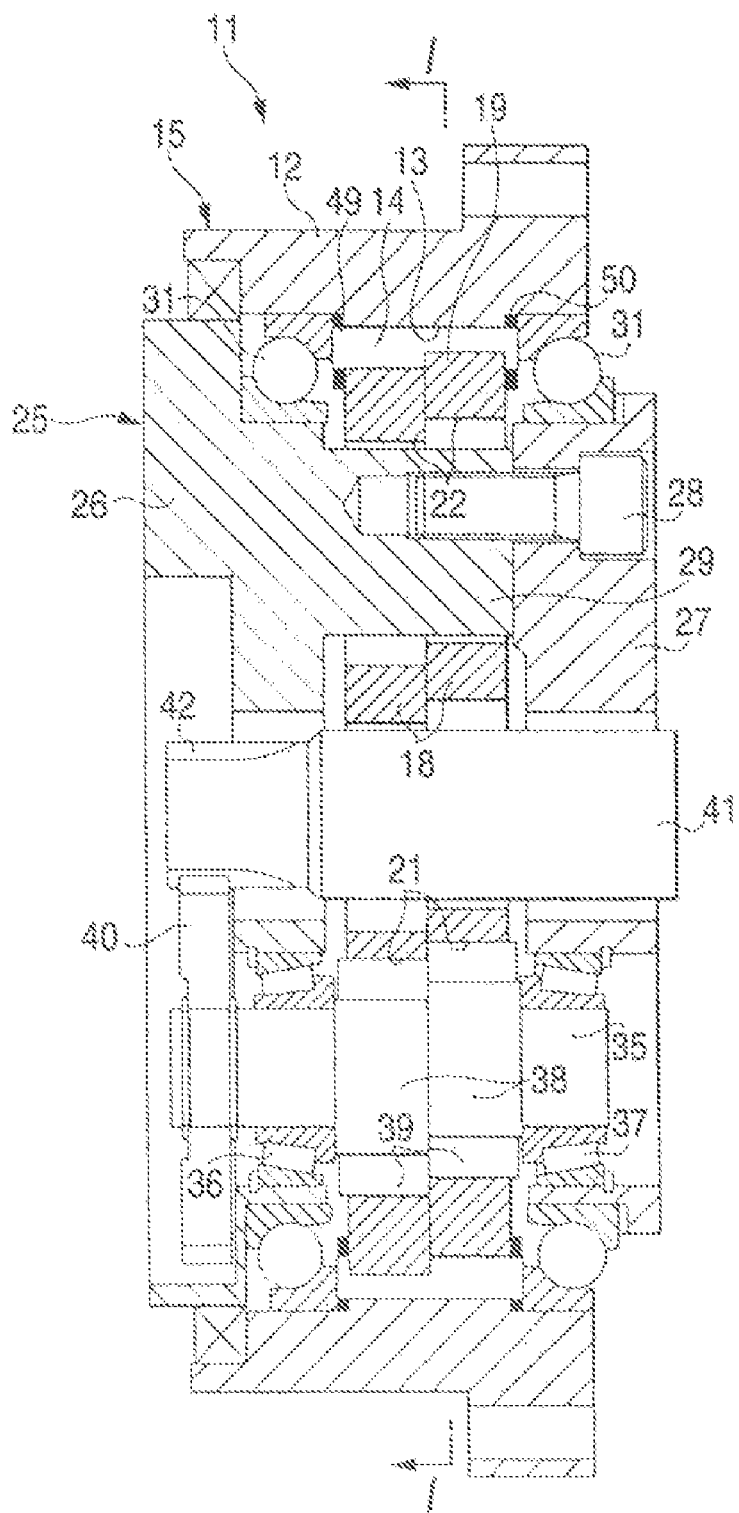
FIG. 1 is a side sectional view showing a first embodiment of the invention.
Figure 2:
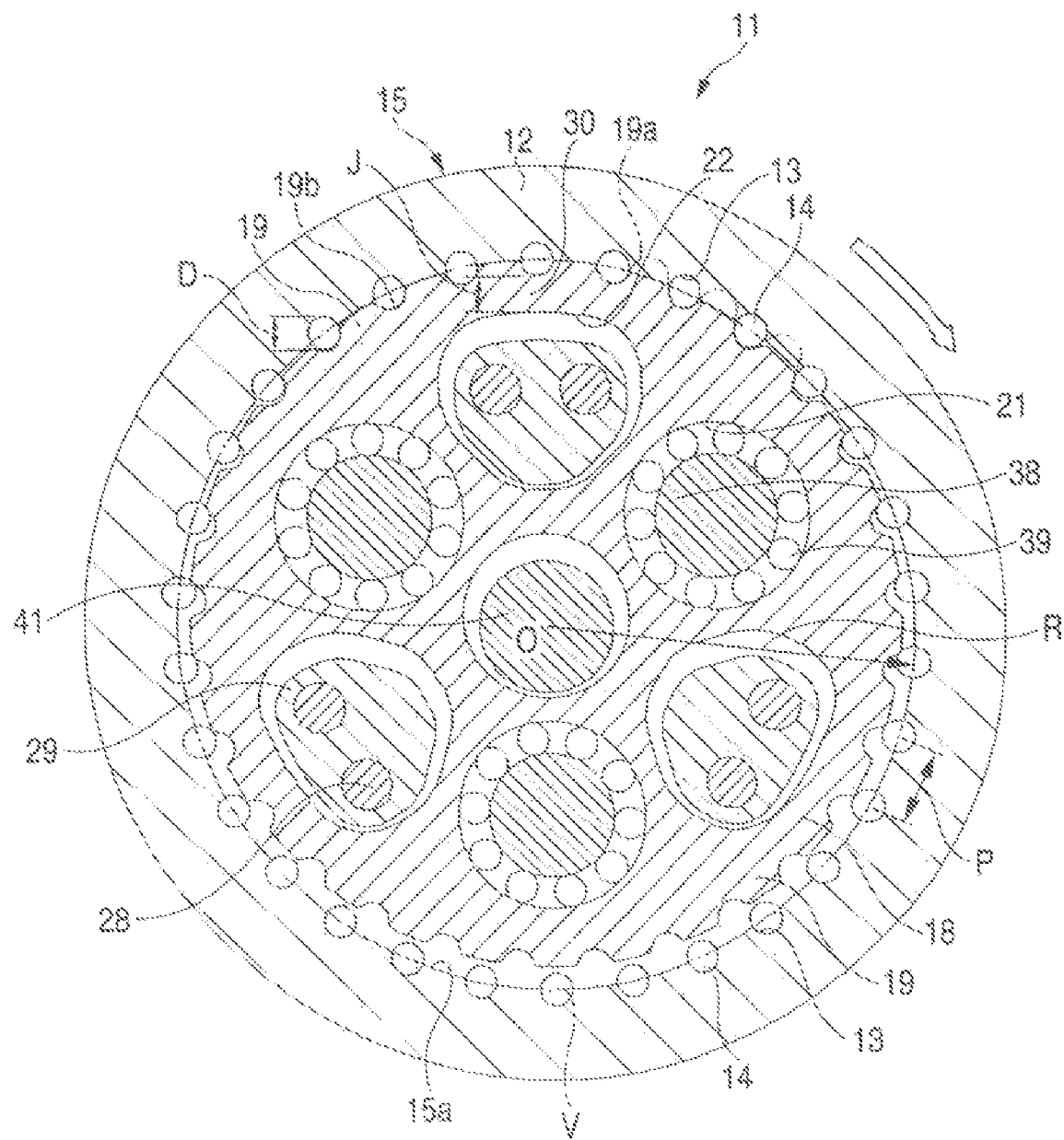
FIG. 2 is a cross-sectional view taken along the line I-I of FIG. 1.

In FIGS. 1 and 2, reference numeral 11 denotes an eccentric oscillating-type planetary gear device. The planetary gear device 11 has an approximately cylindrical rotary case 12 that is mounted on an arm or hand of a robot (not shown). A plurality of pin grooves 13 having semicircle sectional shapes are formed at a central portion in an axial direction at an inner periphery of the rotary case 12. The pin grooves 13 extend in the axial direction and are arranged at constant distances in a circumferential direction. Herein, the pin grooves 13 are disposed at constant pitches P. Reference numeral 14 denotes internal teeth having a plurality of pillar pins (equal in number to the pin grooves 13). The internal teeth (pins) 14 are provided at constant distances (constant pitches P) on the inner periphery of the rotary case 12 in the circumferential direction, such that approximately halves of the internal teeth are inserted into the pin grooves 13.

Here, the constant pitch P is a value obtained by dividing a circumferential length of a pin circle V passing the centers of the pins constituting the all the internal teeth 14 by the number of the internal teeth (pins) 14, that is, an arc length when centers of two adjacent internal teeth (pins) 14 are connected by an arc segment. The rotary case 12 and the internal teeth (pins) 14 described above constitute an internally toothed gear 15 as a whole, in which the internal teeth 14 having a plurality of rod-shaped pins on an inner periphery 15a are provided. As a result, the inner periphery 15a of the internally toothed gear 15 (fixed case 12) is positioned on the pin circle V or in the vicinity of the pin circle V to an extent that at least the internal teeth (pins) 14 can be held.

Here, the number of the internal teeth (pins) 14 is about 25 to 100, and preferably, in a range of 30 to 80. The reason is that, if the number of the internal teeth (pins) 14 is set in the above-described range, a spur gear speed reducer having a reduction ratio of 1/1 to 1/7 and including external gears 40 and 42 described below is provided at a front stage of meshing of an externally toothed gear 18 and an internally toothed gear 15 described below so as to combine a reduction ratio of the front stage and a rear stage, it is possible to construct a high-reduction-ratio planetary gear device, in which a high reduction ratio can be easily obtained, and a natural vibration frequency is high.

A plurality (in this embodiment, two) of externally toothed gears 18 having ring shapes are arranged in an axial direction and accommodated in the internally toothed gear 15, and a plurality of external teeth 19 having a trochoid profile, specifically, a peritrochoid profile are formed on the outer periphery of the externally toothed gear 18. Then, the number Z of the external teeth 19 of the externally toothed gear 18 is less than the number of the internal teeth (pins) 14 by one (a difference in the number of teeth is one). The reason why the difference in the number of teeth between the internal teeth (pins) 14 and the external teeth 19 is one is that a high reduction ratio can be obtained and processing costs can be reduced compared with a case where the difference in the number of teeth is a value G of two or more.

The externally toothed gear in which the difference in the number of teeth is the value G of two or more refers to an externally toothed gear in which external contours of a trochoid, externally toothed gear are shifted in a circumferential direction by a distance obtained by dividing the pitch between the external teeth 19 by the value G, and overlap parts of G external contours shifted in the circumferential direction are extracted as a profile (see JP-A-3-181641). Then, the external teeth 19 and the internal teeth (pins) 14 are meshed with each other in a state where the externally toothed gear 18 and the internally toothed gear 15 internally come into contact with each other. However, the maximum meshing portions (those portions where the depth of meshing is the largest) are 180 degrees out of phase with each other.

At least one, in this embodiment, three crank shaft holes 21 are formed through each of the externally toothed gears 18 in the circumferential direction. The plurality of crank shaft holes 21 are arranged from the central axis of the externally toothed gear 18 at constant distances in a radial direction and arranged at constant distances in the circumferential direction. Reference numeral 22 denotes a plurality (equal in number to the crank shaft holes 21, that is, three) of through holes formed in each of the externally toothed gear 18. The through holes 22 and the crank shaft holes 21 are arranged alternatively in the circumferential direction and are arranged at constant distances in the circumferential direction. Then, the through holes 22 have base shapes having a circumferential width is widened radially outward.

Reference numeral 25 denotes a support body (carrier) loosely fitted into a rotary case 12 and mounted on a fixed robot member (not shown). The support body 25 has a pair of approximately ring-shaped end plate portions 26 and 27 respectively facing axial outer surfaces of the externally toothed gears 18, and a plurality (equal in number to the through holes 22, that is, three) of pillar portions 29 that are integrally connected at their one ends to the end plate portion 26 and are detachably connected at the other ends to the end plate portion 27 by a plurality of bolts 28. The pillar portions 29 that interconnect the end plate portions 26 and 27, extend in the axial direction, and are inserted (loosely fitted) into the respective through holes 22 of the externally toothed gears 18 while holding at a slight gap.

As such, since the pillar portions 29 are loosely fitted into the through holes 22, the portions of the externally toothed gear 18 positioned radially outside the through holes 22 constitute bridge portions 30 that are not supported internally. The thickness of each of the bridge portions 30 (a radial distance from radially outer ends of the through holes 22 to tooth bottoms 19b of the external teeth 19 of the externally toothed gear 15 becomes the minimum thickness) is made smaller than other portions, and thus bending rigidity is low.

Reference numeral 31 denotes a pair of bearings interposed between the support body 25 and the rotary case 12, and specifically, between the outer peripheries of the end plate portions 26 and 27 and the inner periphery of both axial end portions of the rotary case 12. With the bearings 31, the internally toothed gear 15 is rotatably supported on the support body 25. Reference numeral 35 denotes at least one crank shaft (equal in number to the crank shaft holes 21, that is, three) arranged at constant angles in the circumferential direction. The plurality of crank shafts 35 are rotatably supported on the support body 25 and more specifically on the end plate portions 26 and 27 by a conical bearing 36 externally fitted on one axial end portion and a conical bearing 37 externally fitted on the other axial end portion.

The crank shaft 35 has two eccentric cams 38 that are formed on its axially central portion and offset a constant distance from the central axis thereof. The two eccentric cams 38 are 180 degrees out of phase with each other. The eccentric cams 38 of the shaft 35 are loosely fitted into the crank shaft holes 21 of the externally toothed gear 18, respectively, and a needle bearing 39 is interposed between the eccentric cams 38. As a result, relative rotation of the externally toothed gear 18 and the crank shaft 35 is allowed. Further, an external gear 40 is fixed at one axial end of each of the crank shafts 35, and an external gear 42 provided at one end of an output shaft 41 of a driving motor (not shown) is meshed with the external gear 40.

Figure 3:
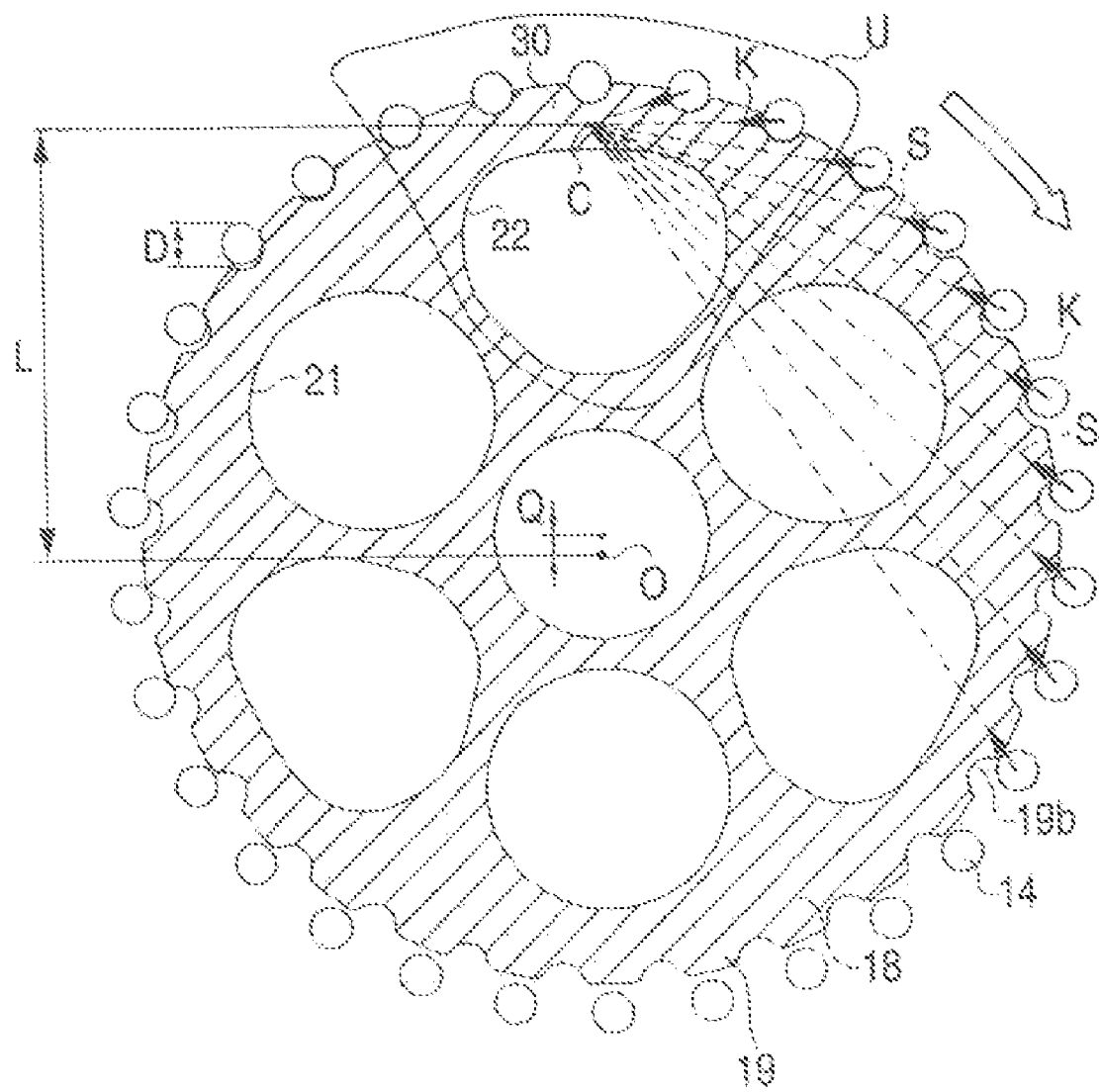
FIG. 3 is an explanatory view showing reaction force K given to an external teeth and action lines S.
Figure 4:
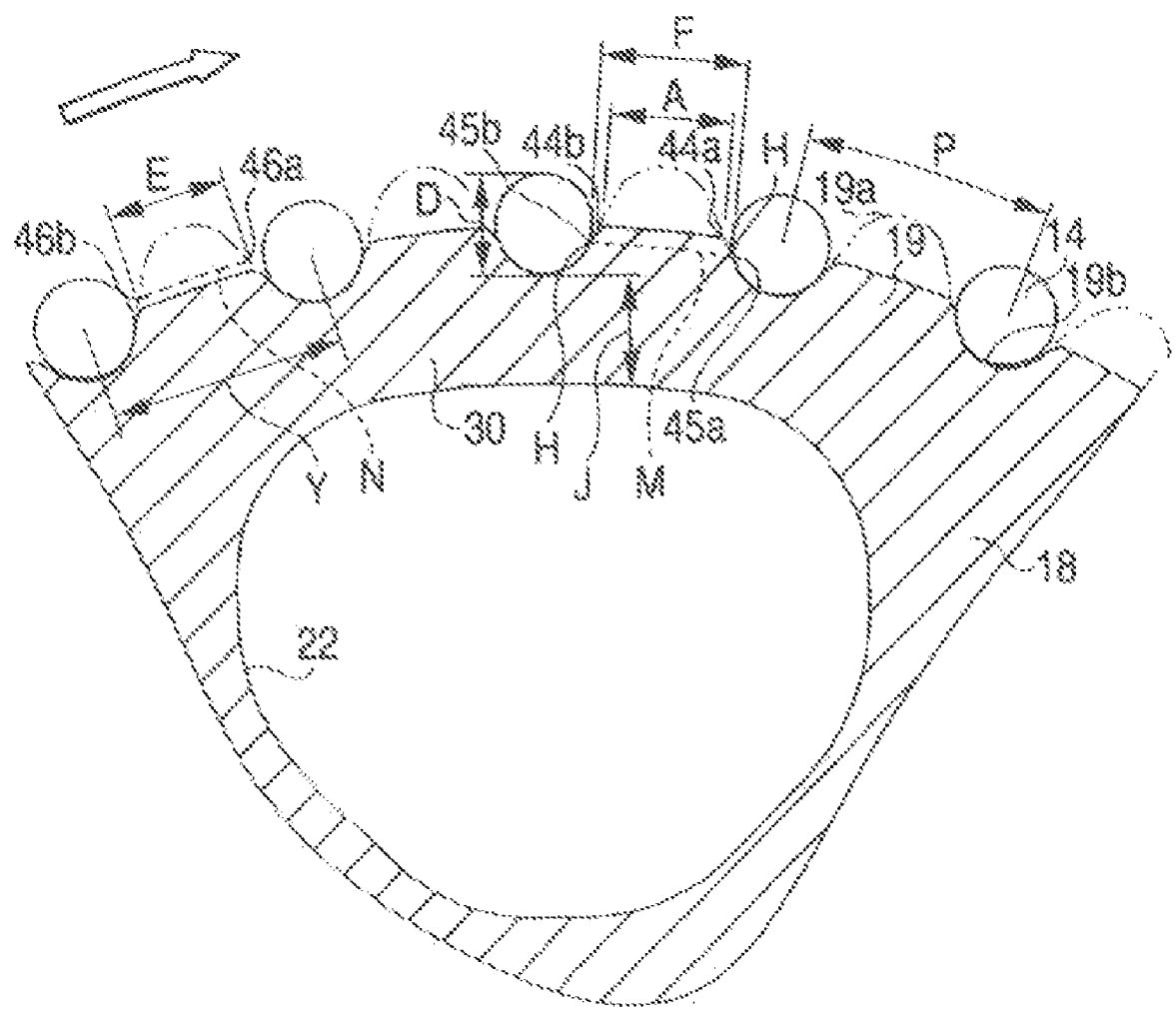
FIG. 4 is an expanded view of a U portion of FIG. 3.

Then, if the driving motor operates and the external gear 40 rotates, the crank shaft 35 rotates around its central axis, which causes eccentric rotation of the eccentric cams 38 of the crank shaft 35 in the crank shaft holes 21 of the externally toothed gear 18 and eccentric rotation and oscillation of the externally toothed gear 18 in an arrow direction. At this time, at contact points where the internal teeth (pins) 14 and the external teeth 19 are meshed with each other, as shown in FIGS. 2, 3, and 4, drive force components in directions of action lines S are correspondingly given from the external teeth 19 to the internal teeth (pins) 14. As the reaction, reaction force K of the drive force component in the direction of the action lines S is respectively given from the internal teeth (pins) 14 to the external teeth 19.

The action lines S of the reaction force K described above are positioned on lines perpendicular to the tooth surfaces at the contact points. As described above, since the internal teeth (pins) 14 have rod shapes and the external teeth 19 have a trochoid profile, the plurality of action lines S meet (cross) at one point on the externally toothed gear 18, that is, at a meeting point C. Then, the sum of tangential components of the drive force components is given to the internally toothed gear 15 as a rotary driving force.

A part of the reaction force K of the drive force components is applied to the bridge portions 30 having low bending rigidity. Then, due to the reaction force K, the bridge portions 30 and the external teeth 19 close to the bridge portions 30 are elastically deformed, and thus the external teeth 19 and the internal teeth (pins) 14 are unevenly meshed, which causes the short life of the tooth surfaces of the external teeth 19. Further, a natural vibration frequency becomes low, and thus vibration characteristics and controllability can be degraded.

For this reason, in the first embodiment, a ratio B obtained by dividing the diameter D of each of the pins constituting the internal teeth 14 by the constant pitch P of the internal teeth 14 is made smaller to an extent where tooth tops 19a of the external teeth 19 indicated by virtual lines are radially outside the inner periphery 15a of the internally toothed gear 15. For example, when the number of the internal teeth (pins) 14 is 40, the ratio B is made smaller, about 0.32, than about 0.55 in the related art. Accordingly, the diameter D of the internal teeth (pins) 14 is made smaller compared with the related art, and the tooth bottoms 19b of the external teeth 19 of the externally toothed gear 18 are moved radially outward.

Then, as described above, the tooth bottoms 19b of the external teeth 19 are moved radially outward, a radial distance from the radially outer ends of the through holes 22 to the tooth surfaces 19b of the external teeth 19, that is, the thickness of the bridge portions 30 is made thicker compared with the related art, and thus bending rigidity is increased. As a result, when the reaction force K is applied, elastic deformation of the bridge portions 30 and the external teeth 19 can be suppressed, and the life of the tooth surfaces of the external teeth 19 can extend. Further, even though a torque load exists, a natural vibration frequency increases, and thus vibration characteristics and controllability can be improved.

As described above, if the diameter D of the internal teeth (pins) 14 is made small, the thickness and length of the external teeth 19 whose both tooth surfaces (rotation direction front tooth surface and rear tooth surface) come into contact with adjacent internal teeth (pins) 14 is made larger. Then, as described above, if the ratio B is made smaller until the tooth tops 19a are radially outside the inner periphery 15a, the external teeth 19 having a larger length interfere with the inner periphery 15a. For this reason, portions of the external teeth 19 exceeding at least the inner periphery 15a of the internally toothed gear 15 are cut, and thus interference of the external teeth 19 and the inner periphery 15a of the internally toothed gear 15 is prevented.

In the first embodiment, a maximum meshing portion of the internally toothed gear 15 and the externally toothed gear 18 is cut to an extent that a small gap occurs between front ends of the external teeth of the external teeth 19 after cutting and the inner periphery 15a of the internally toothed gear 15, such that the interference of the external teeth 19 and the inner periphery 15a of the internally toothed gear 15 is prevented. Then, when a distance between a rotation direction front edge 44a and a rotation direction rear edge 44b of the external teeth 19 after cutting is A, the diameter D of each of the pins constituting the internal teeth 14 is preferably made smaller than the distance A.

Preferably, the cut position in the external teeth 19 of the externally toothed gear 18 is set radially outside a line M connecting inflection points H at both tooth surfaces (rotation direction front tooth surface and rear tooth surface) of the external teeth 19. In addition, the diameter D of each of the pins constituting the internal teeth 14 is set to be equal to or more than a value obtained by subtracting from an inter-center linear distance Y of two adjacent pins constituting the internal teeth 14 a distance F between the rotation direction front edge 45a and a rotation direction rear edge 45b of the external teeth 19 after cutting by the line M. The reason is that, with this configuration, the inflection points H serving for maximum torque transmission (the maximum contact pressure to the internal teeth 14 is obtained) remain without cutting, and thus a reduction in torque transmission can be suppressed. Here, the line M is a line of an arc passing both inflection points H with the central axis of the externally toothed gear 18 as the center of curvature.

Preferably, the cut position in the external teeth 19 of the externally toothed gear 18 is set radially inside a border N of a tooth toe portion and a tooth tip portion of the external teeth 19 (at a height half of the length). In addition, the diameter D of each of the pins constituting the internal teeth 14 is set to be equal to or less than a value obtained by subtracting from the inter-center linear distance Y a distance E between a rotation direction front edge 46a and a rotation direction rear edge 46b of the external teeth 19 after cutting by the line M. The reason is that, slipping between the external teeth 19 and the internal teeth (pins) 14 radially outside the border N is significant upon meshing, but, according to the above-described configuration, a portion where slipping between the external teeth 19 and the internal teeth (pins) 14 is little can remain, and thus noise and heat generation can be reduced.

From this configuration, preferably, when a distance between the radiation direction front edge 45a and the radiation direction rear edge 45b of the external teeth 19 after the external teeth 19 are cut by the line M connecting the inflection points H of both tooth surfaces is F, and the distance between the rotation direction front edge 46a and the rotation direction rear edge 46b of the external teeth 19 after the external teeth 19 are cut by the border N of the tooth toe portion and the tooth tip portion is E, the external teeth 19 are cut radially outside the line M and radially inside the border N, the diameter D of each of the pins constituting the internal teeth 14 is set to be equal to or more than the value obtained by subtracting the distance F from the inter-center linear distance Y or to be equal to or less than the value obtained by subtracting the distance E from the inter-center linear distance Y.

Preferably, when the radius of the pin circle V is R and the number of the external teeth 19 of the externally toothed gear 18 is Z, the diameter D of each of the pins constituting the internal teeth 14 is in a range of $2R/Z \pm 1.5$ mm. The reason is that, if the diameter D is in the above-described range, as will be apparent from a graph of FIG. 5, Hertz stress at the contact points of the internal teeth (pins) 14 and the external teeth 19 maintains a low value inside a point where the Hertz stress starts to rapidly increase, and thus the life of the tooth surfaces of the external teeth 19 can extend.

Figure 5:
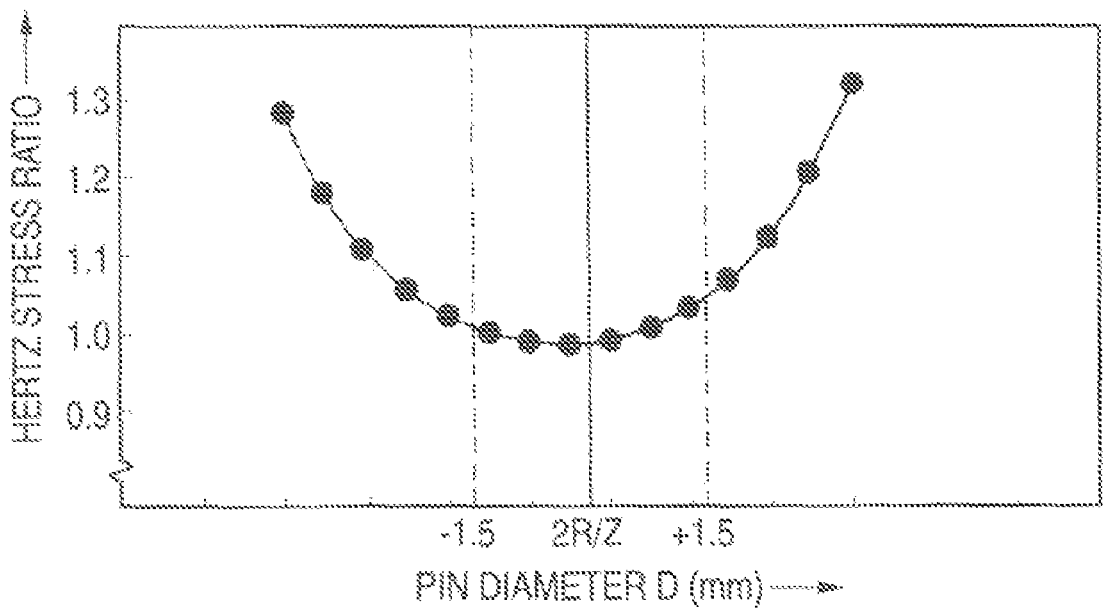
FIG. 5 is a graph showing the relationship between the diameter D of internal teeth (pins) and a Hertz stress ratio.

The graph shown in FIG. 5 is obtained by performing a simulation under the following conditions. That is, the number of the internal teeth (pins) of each planetary gear device is 40, the radius R of the pin circle V is 120 mm, the number of the external teeth is 39, and the amount Q of eccentricity of the externally toothed gear 18 with respect to the internally toothed gear 15 is 2.7mm. Here, the values are fixed. Then, the Hertz stress at the contact points of the external teeth 19 and the internal teeth (pins) 14 can be obtained while the diameter D of each of the internal teeth (pins) 14 is changed. Here, in FIG. 5, the Hertz stress value when the diameter D is fixed as $2R/z$ is represented as the index 1.

As described above, as the diameter D is made small, a method of moving the tooth bottoms 19b of the external teeth 19 radially outward includes a method of making a tooth bottom circle passing all the tooth bottoms 19b of the externally toothed gear 18 while leaving the amount Q of eccentricity of the externally toothed gear 18 with respect to the internally toothed gear 15 unchanged, a method of increasing the amount Q of eccentricity while leaving the tooth bottom circle unchanged, and a method of making the tooth bottom circle and the amount Q of eccentricity large. In the first embodiment, the amount Q of eccentricity increases while the tooth bottom circle is fixed.

As such, if the amount Q of eccentricity increases, a distance L from the center O of the internally toothed gear 15 to the meeting point C (obtained by multiplying the amount Q of eccentricity by the number of the internal teeth 14) can be made larger compared with related art, that is, the position of the meeting point C can be moved radially outward. At this time, a ratio of the distance L and the radius R of the pin circle V is preferably in a range of 0.86 to 1.00.

The reason is that, if the L/R value is equal to or more than 0.86, the action lines S are inclined in a tangential direction with respect to the externally toothed gear 18. As a result, the bridge portions 30, to which the reaction force K is applied, are made thicker, and thus elastic deformation in the bridge sections 30 can be effectively suppressed. Further, as will be apparent from FIG. 6, since the load ratio is almost constant, and the same torque is obtained, the load relative to torque transmission applied to the external teeth 19 can be almost constant and becomes the minimum. However, since pointed portions at the tooth surfaces occur upon creation of the external teeth 19 if the value of the ratio L/R exceeds 1.00, the value of L/R is preferably set to be equal to or less than 1.00.

Figure 6:
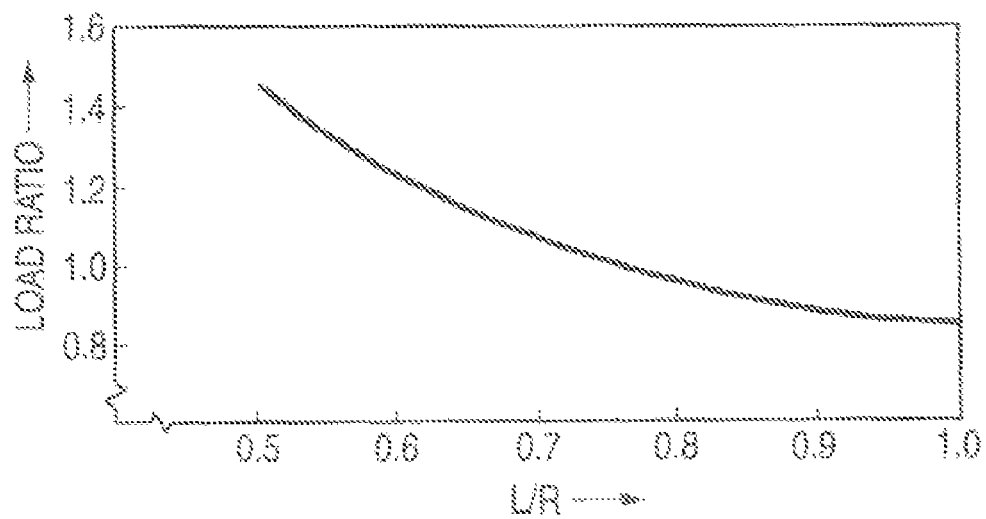
FIG. 6 is a graph showing the relationship between an L/R value and a load ratio.

The above-described graph is obtained by performing a simulation under the following conditions. That is, the number of the internal teeth (pins) of each planetary gear device is 40, the diameter D of each of the internal teeth (pins) is 10 mm, the radius R of the pin circle V is 120 mm, and the number of the external teeth is 39. Here, the values are fixed. Meanwhile, a tangential component of resultant force obtained by synthesizing the drive force components applied to the meeting point C is calculated while the value of L/R changes in a range of 0.5 to 1.00. In FIG. 6, the tangential component when the value of L/R is 0.75 is represented by a graph with the load ratio as the index 1.

As described above, if each of the external teeth 19 is cut by a predetermined amount from the tooth top 19a, only parts of the internal teeth (pins) 14 and the external teeth 19, for example, about a third even though the value of the ratio L/R is 1.0, are meshed. In the first embodiment, about three fourth are meshed with each other, and a fourth of the internal teeth (pins) 14 do not come into contact with the external teeth 19 and are separated from the pin grooves 13. For this reason, in the first embodiment, as shown in FIG. 1, two pin pressing rings 50 serving as regulation means, in which insertion holes 49 are formed are interposed between the bearing 31 and the externally toothed gear 18. Both end portions of the internal teeth (pins) 14 are inserted into the insertion holes 49. In addition, the two pin pressing rings 50 are unrotatably fixed in the internally toothed gear 15 so as to regulate the movement of the above-described internal teeth (pins) 14.

As the above-described regulation means, insertion holes, which are formed at an inner end surface of an outer race of the bearing 31 and into which both end portions of the internal teeth (pins) 14 are inserted, may be used. Alternatively, circumferential grooves, which are formed at an inner end surface of the outer race of the bearing 31 and have a width equal to the diameter of the internal teeth (pins) 14, may be used.

Next, the actions of the first embodiment of the invention will be described.

Now, the driving motor operates and the crank shaft 35 rotates. At this time, the eccentric cam 38 of the crank shaft 35 eccentrically rotates in the crank shaft hole 21 of the externally toothed gear 18 so as to cause eccentric oscillation and rotation of the externally toothed gear 18. However, since the number of the external teeth 19 of the externally toothed gear 18 is less than the number of the internal teeth (pins) 14 by one, the rotary case 12 and the arm of the robot rotate at low speed by the eccentric oscillation and rotation of the externally toothed gear 18.

As described above, since the ratio B obtained by dividing the diameter D of the internal teeth (pins) 14 is made smaller to an extent where the tooth tops 19a of the external teeth 19 are radially outside the inner periphery 15a of the internally toothed gear 15, the diameter D of the internal teeth (pins) 14 is smaller compared with the related art, and thus the tooth bottoms 19b of the external teeth 19 of the externally toothed gear 18 are moved radially outward. As a result, the thickness J (the minimum thickness) of each of the bridge portion 30 is made thicker compared with the related art, and thus bending rigidity increases.

Accordingly, elastic deformation of the bridge portions 30 and the external teeth 19 when the reaction force K of the drive force components are applied can be suppressed, and thus the life of the tooth surfaces of the external teeth 19 can extend. In addition, the natural vibration frequency can be increased, and thus vibration characteristics and controllability can be improved. Here, according to the above-described configuration, the external teeth 19 interfere with the inner periphery 15a of the internally toothed gear 15. However, the portions of the external teeth 19 exceeding at least the inner periphery 15a of the internally toothed gear 15 are cut, such that the interference of the external teeth 19 and the inner periphery 15a of the internally toothed gear 15 is prevented.

Second Embodiment

Figure 7:
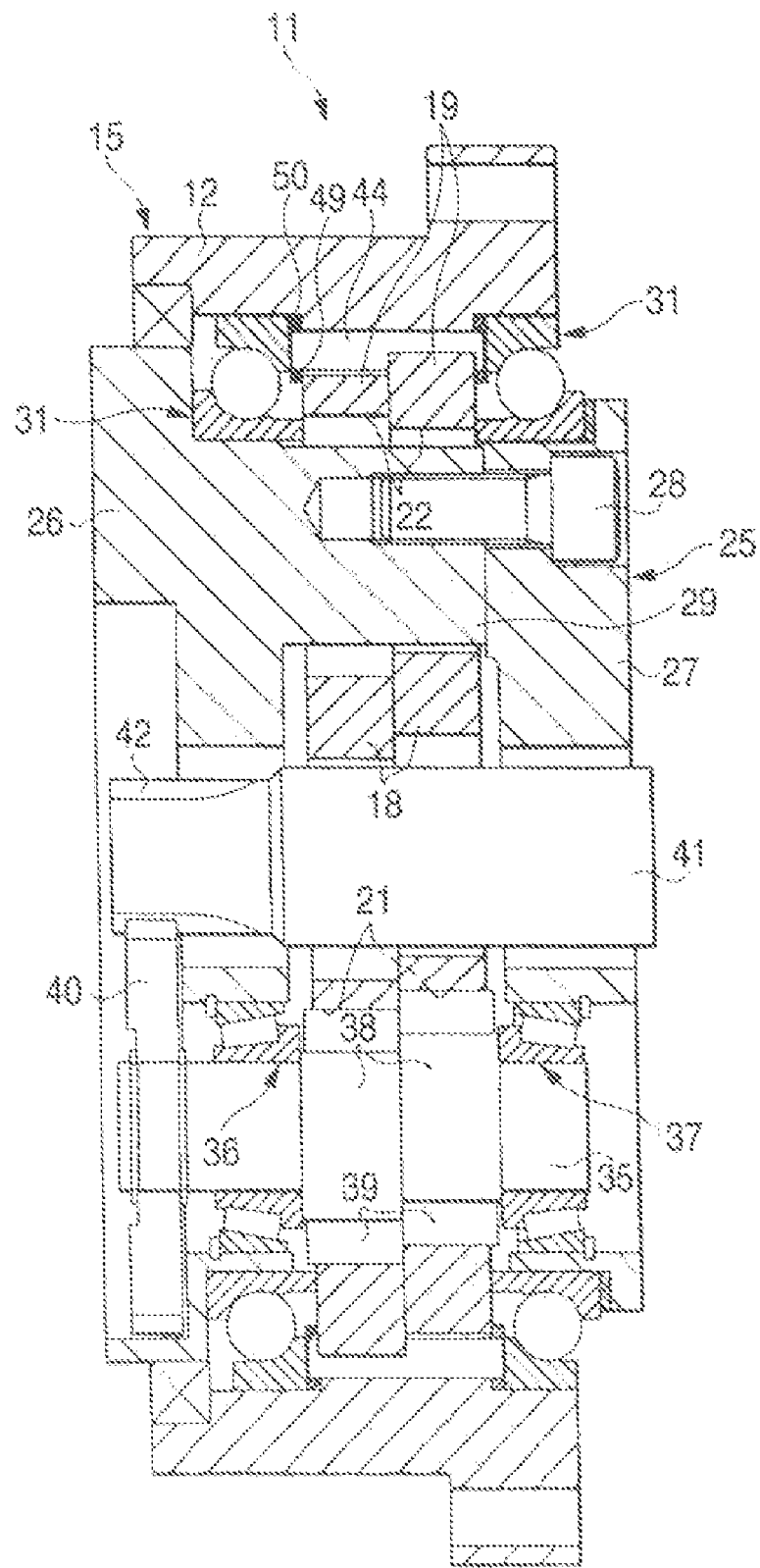
FIG. 7 is a cross-sectional view showing a second embodiment of the invention, which corresponds to FIG. 1.
Figure 8:
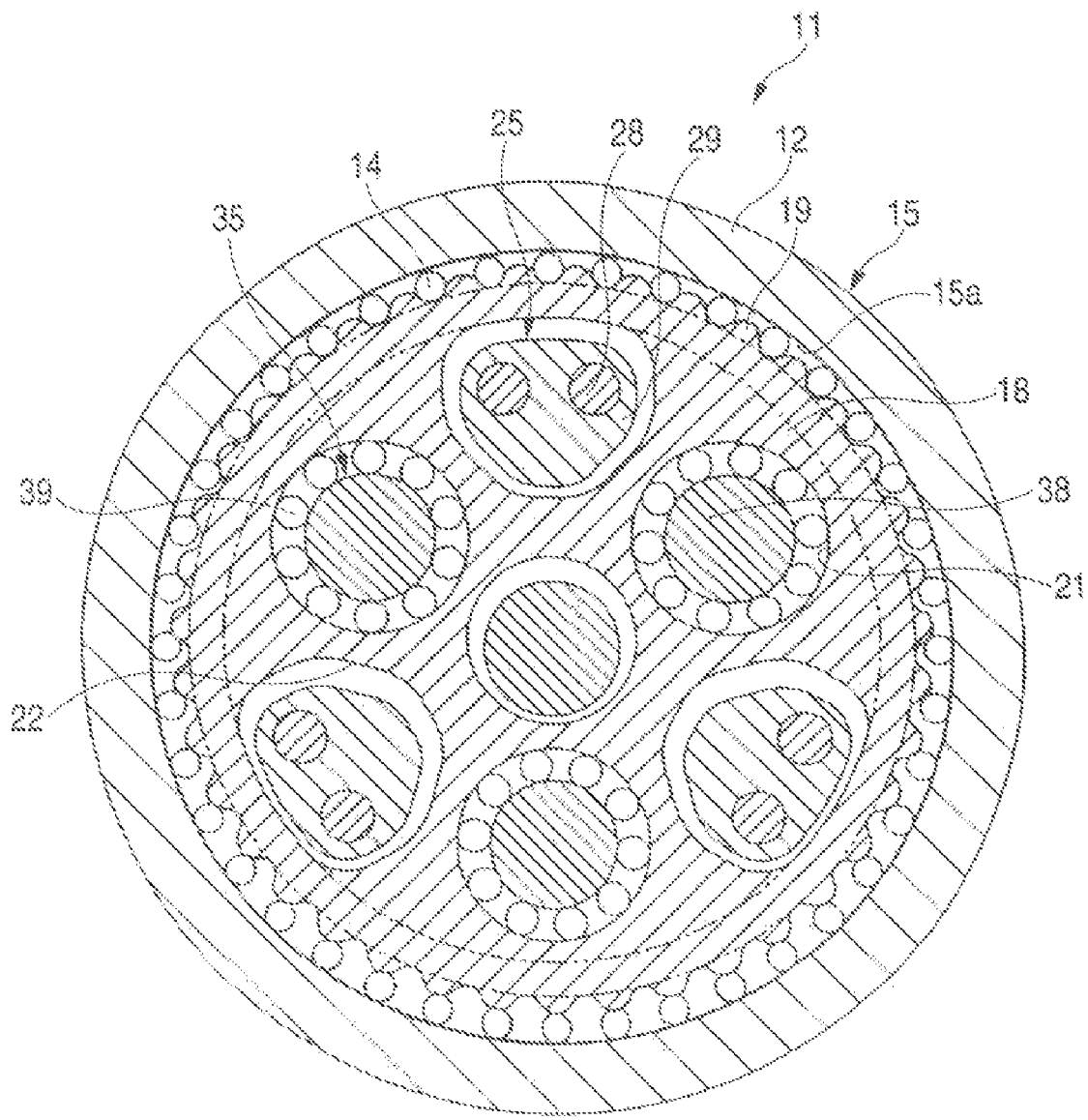
FIG. 8 is a cross-sectional view showing the second embodiment of the invention, which corresponds to FIG. 2.

FIGS. 7 and 8 are diagrams showing a second embodiment of the invention. In the second embodiment, unlike the first embodiment, cutting of the external teeth 19 is not performed, but the inner periphery of the internally toothed gear 15 (the rotary case 12) between adjacent internal teeth (pins) 14 and the inner periphery in the vicinity of the internal teeth (pins) 14 are cut by a depth equal to or more than an amount of the external teeth 19 exceeding the inner periphery, for example, in this embodiment, by a depth equal to approximately half of the diameter D of the internal teeth (pins) 14, such that the interference of the external teeth 19 and the inner periphery 15*a* of the internally toothed gear 15 (the rotary case 12) after cutting is prevented.

As a result, radially outer ends of the internal teeth (pins) 14 come into linear contact with the inner periphery 15*a* of the internally toothed gear 15 after cutting, and thus radial components of the drive force components respectively given to the internal teeth (pins) 14 are received by the rotary case 12. At this time, since the pin grooves 13 do not exist, the internal teeth (pins) 14 can be freely moved, but the movement of the internal teeth (pins) 14 is regulated by the pin pressing rings 50 described above. Moreover, other parts and actions are the same as the first embodiment.

In the first embodiment, the plurality (three) of crank shaft holes 21 are formed in the externally toothed gear 18, and the crank shafts 35 that are uniformly moved in the same direction are respectively inserted into the crank shaft holes 21 so as to cause eccentric oscillation and rotation of the externally toothed gear 18. In the invention, however, an eccentric cam of one crank shaft may be inserted into one crank shaft hole formed on the central axis of the externally toothed gear 18, and the rotation of the crank shaft may cause eccentric oscillation and rotation of the externally toothed gear. In this case, the pillar portions of the support body need to be brought into linear contact with the inner peripheries of the through holes.

In the first embodiment described above, the support body 25 is fixed, and the internally toothed gear 15 rotates at low speed. In the invention, however, the internally toothed gear may be fixed, and the support body may rotate at low speed. In addition, in a planetary gear device 11, in which the diameter D of each of the pins constituting the internal teeth 14 is not made smaller, but is maintained as it is, the external teeth 19 may be cut at any position radially outside the line M connecting the inflection points H, thereby reducing heat generation and noise while suppressing the reduction of torque transmission.

Third Embodiment

Hereinafter, a third embodiment of the invention will be described with reference to the drawings.

Figure 9:
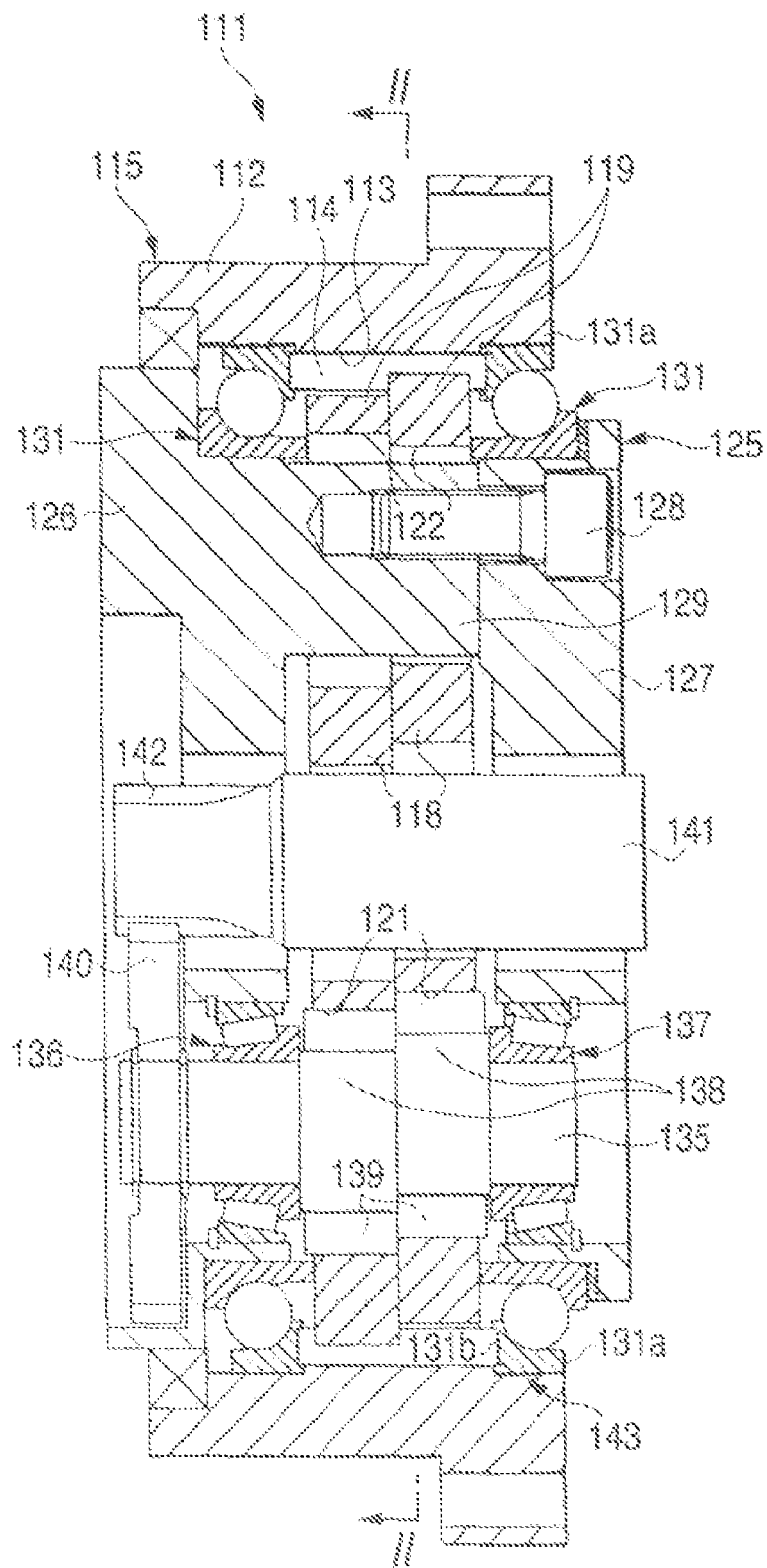
FIG. 9 is a side sectional view showing a third embodiment of the invention.
Figure 10:
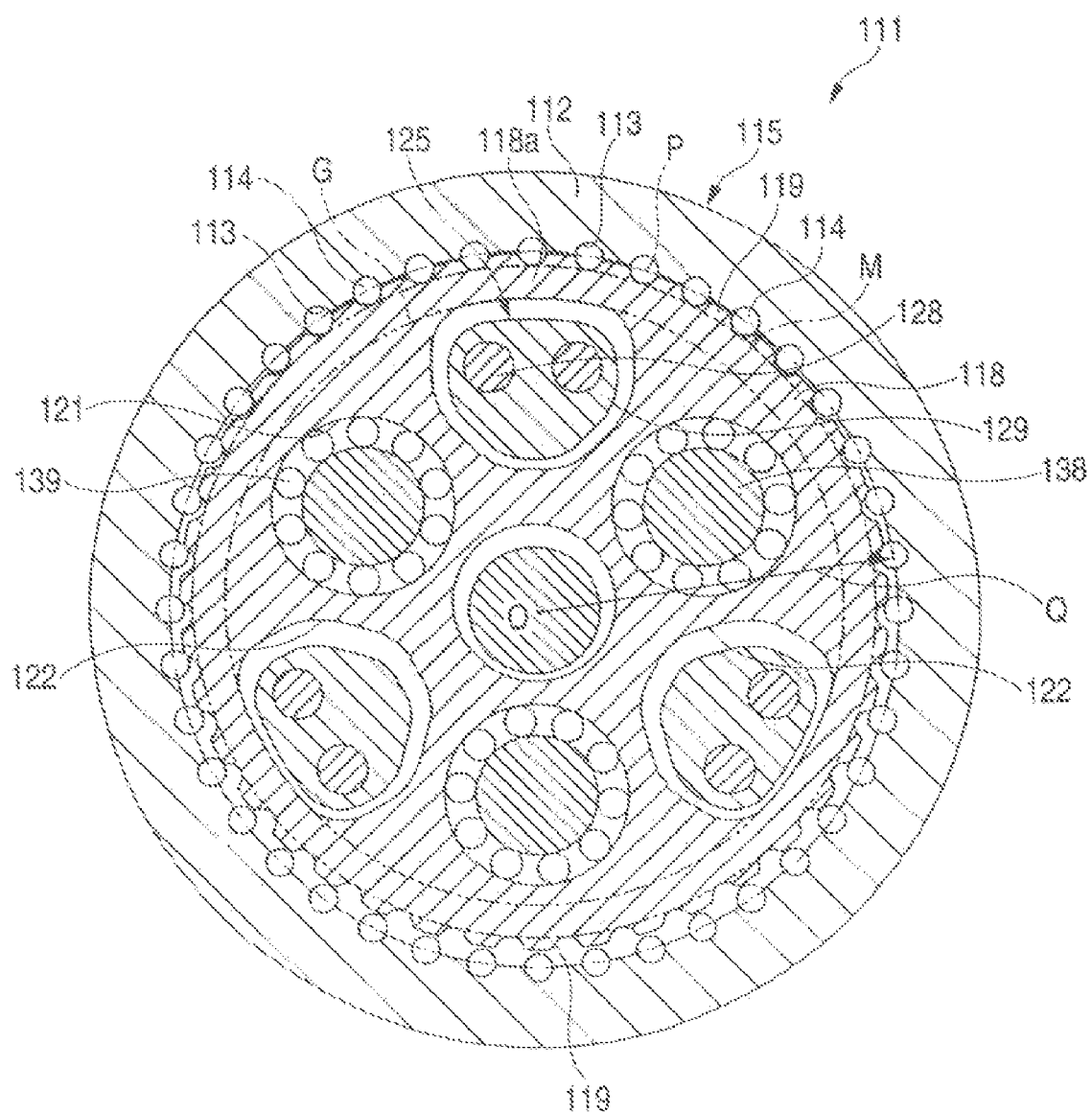
FIG. 10 is a cross-sectional view taken along the line II-II of FIG. 9.
Figure 11:
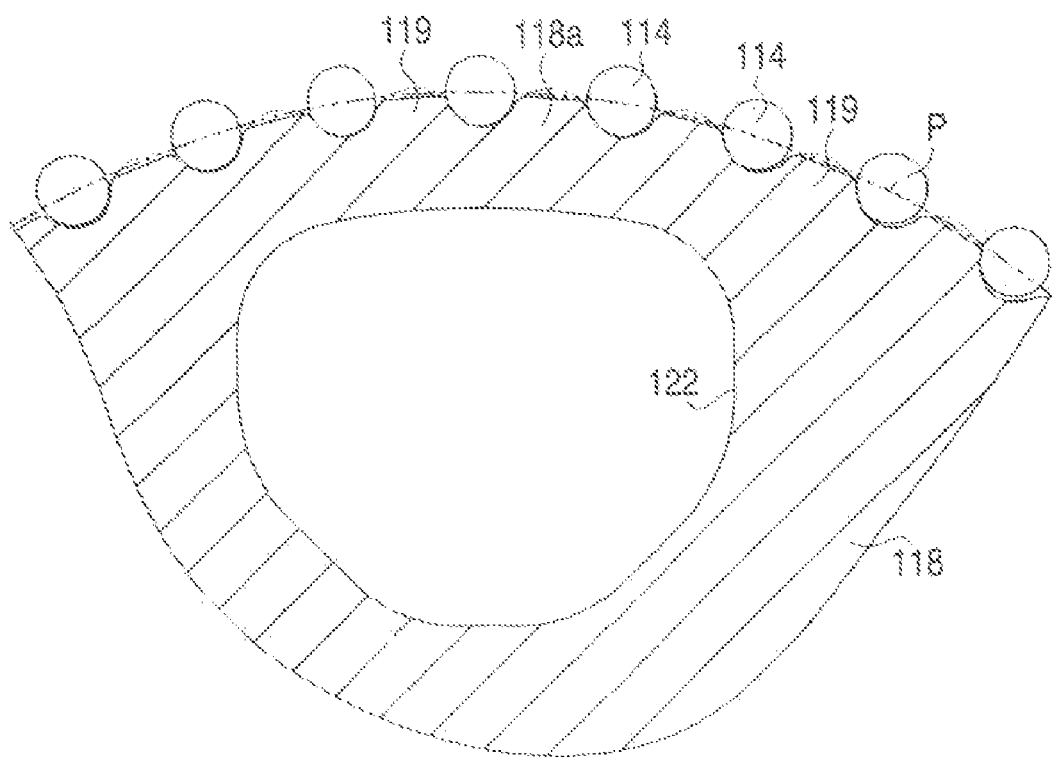
FIG. 11 is a cross-sectional view showing a state where internal teeth and external teeth are meshed with each other, which corresponds to FIG. 10.

In FIGS. 9, 10, and 11, reference numeral 111 denotes an eccentric oscillating-type planetary gear device that is used in a robot or the like. The planetary gear device 111 has an approximately cylindrical rotary case 112 that is mounted on an arm or hand of a robot (not shown). A plurality of pin grooves 113 having semicircle sectional shapes are formed at a central portion in an axial direction at an inner periphery of the rotary case 112. The pin grooves 113 extend in the axial direction and are arranged at constant distances in the circumferential direction.

Reference numeral 114 denotes internal teeth having a plurality of pillar pins (equal in number to the pin grooves 113). The internal teeth (pins) 114 are provided at constant distances on the inner periphery of the rotary case 112 in the circumferential direction, such that approximately halves of the internal teeth are inserted into the pin grooves 113. The rotary case 112 and the internal teeth (pins) 114 described above constitute an internally toothed gear 115 as a whole, in which the internal teeth 114 having a plurality of rod-shaped pins on an inner periphery are provided. Here, the number of the internal teeth (pins) 114 is about 25 to 100, and preferably, in a range of 30 to 80. The reason is that, if the number of the internal teeth (pins) 114 is set in the above-described range and external gears 140 and 142 described below are combined, it is possible to construct a high-reduction-ratio planetary gear device, in which a required reduction ratio can be easily obtained, and a natural vibration frequency is high.

A plurality (in this embodiment, two) of externally toothed gears 118 having ring shapes are arranged in an axial direction and accommodated in the internally toothed gear 115, and a plurality of external teeth 119 having a trochoid profile, specifically, a peritrochoid profile are formed on the outer periphery of the externally toothed gear 118. Then, the number of the external teeth 119 of the externally toothed gear 118 is less than the number of the internal teeth (pins) 114 by one (a difference in the number of teeth is one). The reason why the difference in the number of teeth between the internal teeth (pins) 114 and the external teeth 119 is one is that a high reduction ratio can be easily obtained and processing costs can be reduced compared with a case where the difference in the number of teeth is a value R of two or more.

The externally toothed gear in which the difference in the number of teeth is the value R of two or more refers to an externally toothed gear in which external contours of a trochoid, externally toothed gear are shifted in a circumferential direction by an angle obtained by dividing the pitch between the external teeth 119 by the value R, and overlap parts of R external contours shifted in the circumferential direction are extracted as a profile (see JP-A-3-181641). Then, the external teeth 119 and the internal teeth (pins) 114 are meshed with each other in a state where the externally toothed gear 118 and the internally toothed gear 115 internally come into contact with each other. However, the maximum meshing portions (those portions where the depth of meshing is the largest) of the two externally toothed gears 18 are 180 degrees out of phase with each other.

At least one, in this embodiment, three crank shaft holes 121 are formed through each of the externally toothed gears 118 in the circumferential direction. The plurality of crank shaft holes 121 are arranged from the central axis of the externally toothed gear 118 at constant distances in a radial direction and arranged at constant distances in the circumferential direction. Reference numeral 122 denotes a plurality (equal in number to the crank shaft holes 21) of through holes formed in each of the externally toothed gear 118. The through holes 122 and the crank shaft holes 121 are arranged alternatively in the circumferential direction and are arranged at constant distances in the circumferential direction. Then, the through holes 122 have base shapes having a circumferential width is widened radially outward.

Reference numeral 125 denotes a support body loosely fitted into a rotary case 112 and mounted on a fixed robot member (not shown). The support body 125 has a pair of approximately ring-shaped end plate portions 126 and 127 respectively facing axial outer surfaces of the externally toothed gears 18, and a plurality (equal in number to the through holes 22) of pillar portions 129 that are integrally connected at their one ends to the end plate portion 126 and are detachably connected at the other ends to the end plate portion 127 by a plurality of bolts 128. The pillar portions 129 that interconnect the end plate portions 126 and 127, extend in the axial direction, and are inserted (loosely fitted) into the respective through holes 122 of the externally toothed gears 118 while holding at a slight gap.

Reference numeral 131 denotes bearings interposed between the support body 125 and the rotary case 112, and specifically, between the outer peripheries of the end plate portions 126 and 127 and the inner periphery of both axial end portions of the rotary case 112. With the bearings 131, the internally toothed gear 115 is rotatably supported on the support body 125. Reference numeral 135 denotes at least one crank shaft (equal in number to the crank shaft holes 121) arranged at constant angles in the circumferential direction. The plurality of crank shafts 135 are rotatably supported on the support body 125 and more specifically on the end plate portions 126 and 127 by a conical bearing 136 externally fitted on one axial end portion and a conical bearing 137 externally fitted on the other axial end portion.

The crank shaft 35 has two eccentric cams 138 that are formed on its axially central portion and offset a constant distance from the central axis thereof. The two eccentric cams 138 are 180 degrees out of phase with each other. The eccentric cams 138 of the shaft 135 are loosely fitted into the crank shaft holes 121 of the externally toothed gear 118, respectively, and a needle bearing 39 is interposed between the eccentric cams 138. As a result, relative rotation of the externally toothed gear 118 and the crank shaft 135 is allowed. Further, an external gear 140 is fixed at one axial end of each of the crank shafts 35 and an external gear 142 provided at one end of an output shaft 141 of a driving motor (not shown) is meshed with the external gear 140.

Then, if the driving motor operates and the external gear 140 rotates, the crank shaft 135 rotates around its central axis, which causes eccentric rotation of the eccentric cams 138 of the crank shaft 135 in the crank shaft holes 121 of the externally toothed gear 118 and eccentric rotation and oscillation of the externally toothed gear 118 in an arrow direction. At this time, at contact points where the internal teeth (pins) 114 and the external teeth 119 are meshed with each other, drive force components in directions of action lines S are correspondingly given from the external teeth 119 to the internal teeth (pins) 114.

Figure 12:
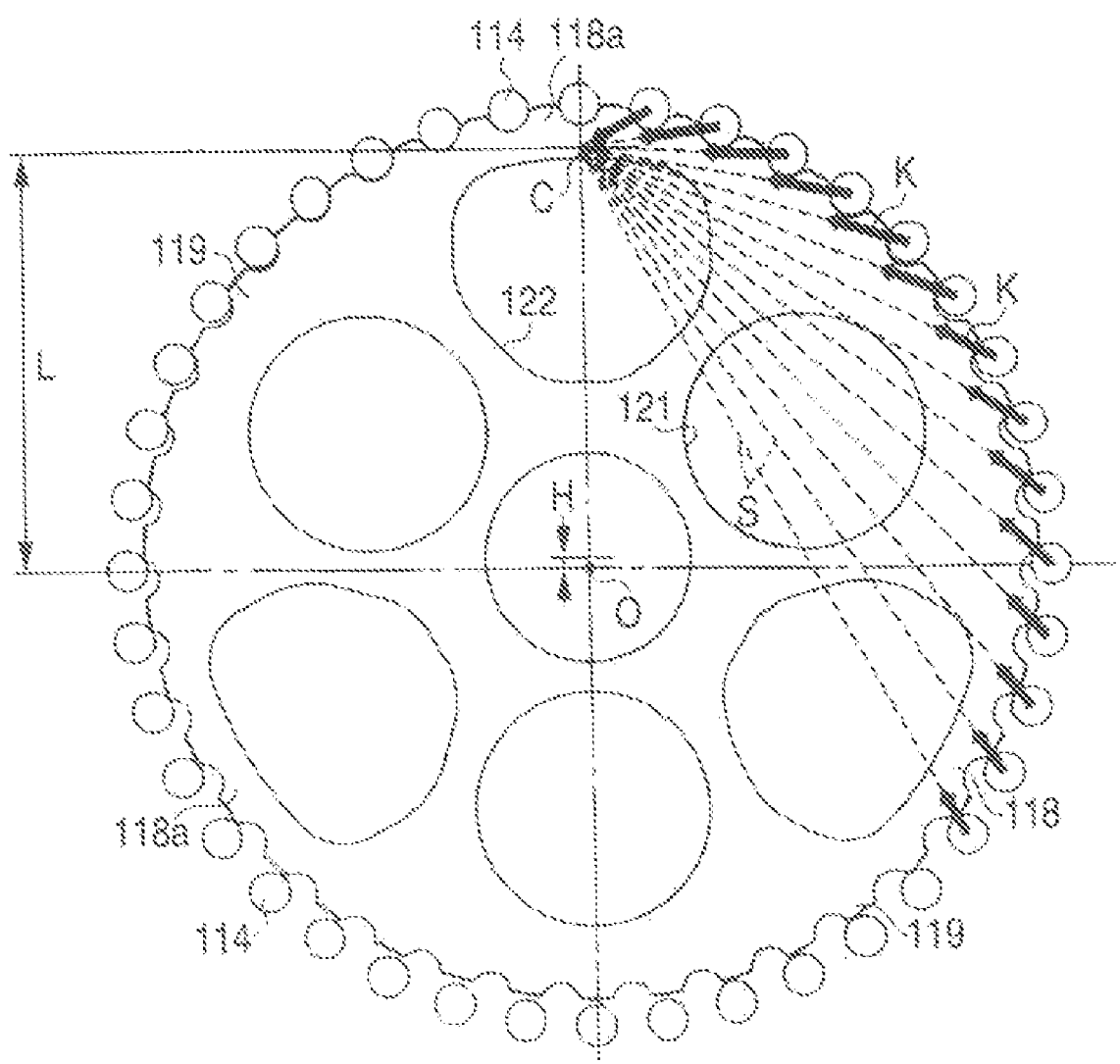
FIG. 12 is an explanatory view showing a state where action lines S of drive force component (reaction force K) meet at a meeting point C.

As shown in FIG. 12, the action lines S of the reaction force K of the drive force components described above are positioned on lines perpendicular to the tooth surfaces at the contact points. As described above, since the internal teeth (pins) 114 have rod shapes and the external teeth 119 have a trochoid profile, the plurality of action lines S meet (cross) at one point on the externally toothed gear 118, that is, at a meeting point C. Then, the sum of tangential components of the drive force components is given to the internally toothed gear 115 as a rotary driving force.

Figure 23:
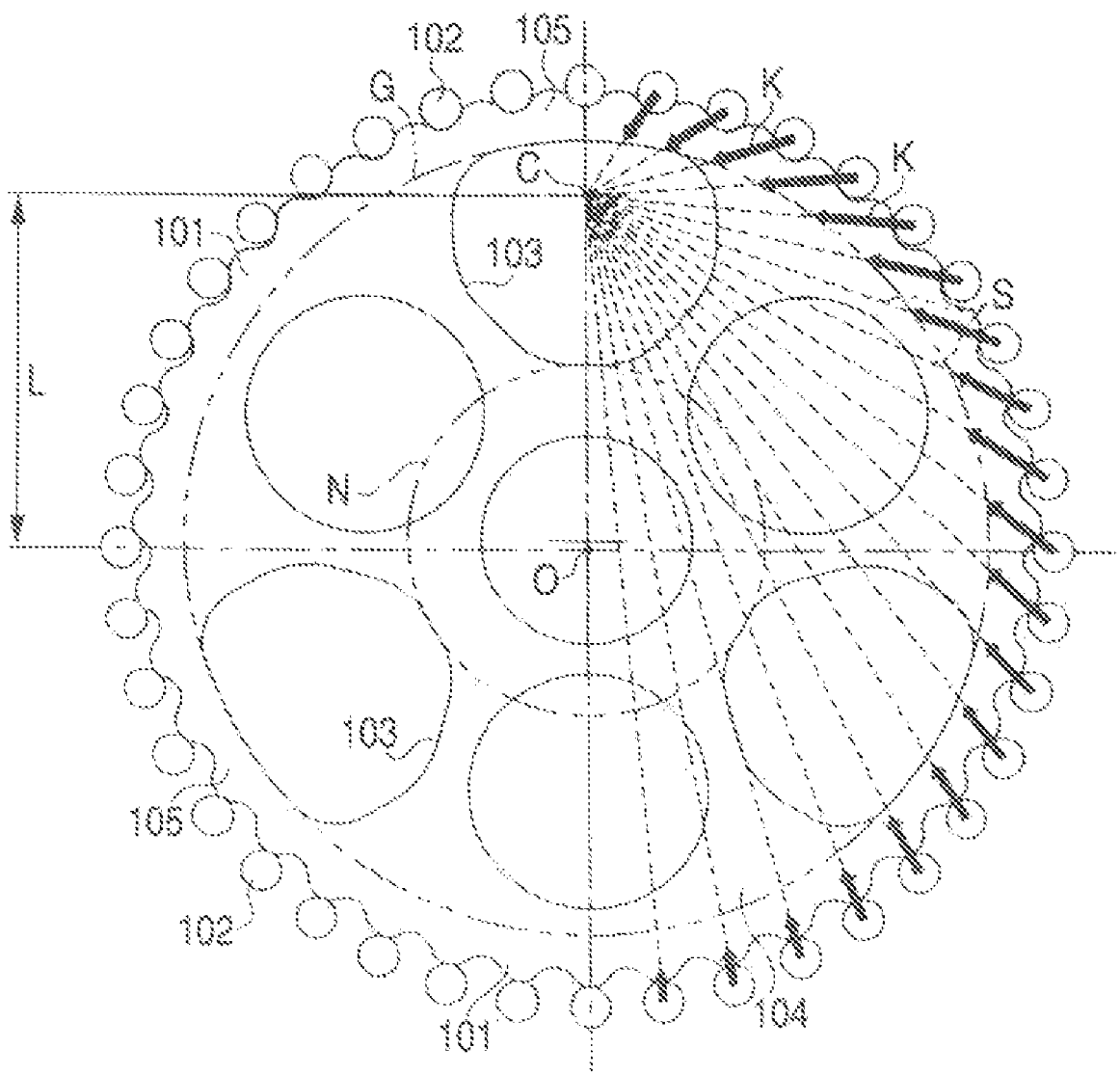
FIG. 23 is an explanatory view showing a state where action lines S of drive force components (reaction force K) described in the background art meet at a meeting point C.

Here, as described in the background art, if the meeting point C is positioned between the outer end passing circle G and the inner end passing circle N (see FIG. 23), a part of the reaction force K of the drive force components (in the vicinity of the maximum meshing portion) is applied to the bridge portions 105 having low rigidity in a direction approximately perpendicular to the extension direction of the bridge portions 105. Then, the bridge portions 105 and the external teeth 101 in the vicinities of the bridge portions 105 are elastically deformed, and the external teeth 101 and the internal teeth (pins) 102 are unevenly meshed, which causes the short life of the tooth surfaces of the external teeth 101.

However, in the third embodiment, the meeting point C is moved radially outward compared with the related art and is positioned radially outside the outer end passing circle G. Accordingly, as shown in FIG. 12, when the meeting point C is positioned on a radial line passing the center of the through hole 122, the action lines S of the reaction force K are inclined toward the tangential direction with respect to the through hole 122 compared with the related art and approach the extension direction of the bridge portions 118a. As a result, the elastic deformation of the thin bridge portions 118a having low rigidity and the external teeth 119 in the vicinity of the bridge portions 118a is suppressed, and the life of the tooth surfaces of the external teeth 119 extends.

Besides, as described above, if the meeting point C is positioned radially outside the outer end passing circle G, tangential components of the reaction force K are allowed to be received by the bridge portions 118a having high tangential rigidity, not by cavity portions of the through holes 122, such that deformation of the through holes 122 can be suppressed. However, if the meeting point C is positioned radially outside the pin circle P passing the centers of all the pins constituting the internal teeth 114, pointed portions at the tooth surfaces of the external teeth 119 occur. Therefore, the meeting point C needs to be positioned between the outer end passing pin G and the pin circle P.

Here, a radial distance L from the center O of the internally toothed gear 115 to the meeting point C can be expressed by multiplying an amount H of eccentricity of the externally toothed gear 118 with respect to the internally toothed gear 115 by the number Z of the internal teeth (pins) 114 of the internally toothed gear 115. Accordingly, in order to make the distance L larger than the distance L in the related art shown in FIG. 23, it is sufficient to make any one or both of the amount H of eccentricity and the number of teeth larger than the related art. In the third embodiment, in order to make the distance L larger, the amount H of eccentricity is made larger. In order to make the distance much larger, the outer diameter of the internal teeth (pins) 114 is made smaller than the related art.

Here, preferably, the value of the ratio L/Q of the radial distance L and the radius Q of the pin circle P is in a range of 0.86 to 1.00. The reason is that, if the value of the ratio L/Q is equal to or more than 0.86, as will be apparent from FIG. 13, since a load ratio is almost constant, and the same torque is obtained, a load (tangential components of the drive force components) relative to torque transmission applied to the external teeth 119 is almost constant and becomes the minimum, but, if the value of the ratio L/Q is less than 0.86, a change in the load ratio is increased, and the load relative to torque transmission applied to the external teeth 119 is increased. Meanwhile, if the value of the ratio L/Q exceeds 1.00, pointed portions at the tooth surfaces occur upon creation of the external teeth 119.

The above-described graph is obtained by performing a simulation under the following conditions. That is, the number of the internal teeth (pins) of each planetary gear device is 40, the diameter of the internal teeth (pins) is 10 mm, the radius Q of the pin circle P is 120 mm, and the number of the external teeth is 39. The values are fixed. Meanwhile, while the value of the ratio L/Q is changed in a range of 0.5 to 1.0, the tangential components of resultant force of the reaction force K applied to the meeting point C are calculated.

Figure 13:
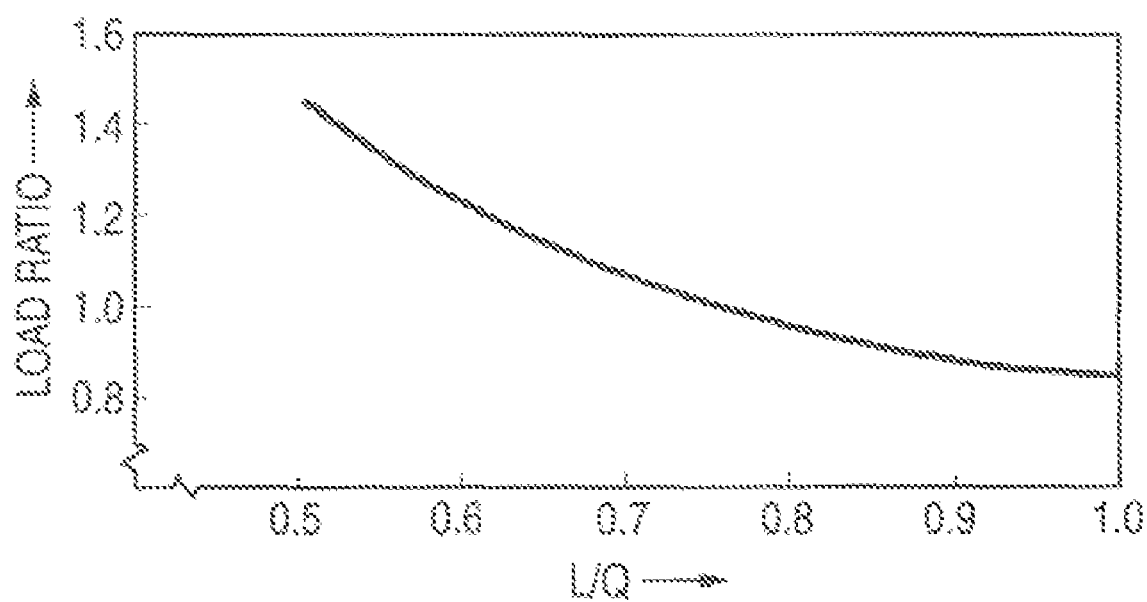
FIG. 13 is a graph showing the relationship between a load ratio and L/Q value.

In FIG. 13, the tangential component when the value of the ratio L/Q is 0.75 is represented by a graph with the load ratio as the index 1.

As described above, if the outer diameter of the internal teeth (pins) 114 is made smaller compared with the related art, and the amount H of the eccentricity is made larger compared with the related art, the external teeth 119 whose both tooth surfaces come into contact with the internal teeth (pins) 114 is made large, that is, the thickness and length thereof are made large. However, since the inner periphery of the rotary case 112 is almost positioned on the pin circle P, if the external teeth 119 is made large, the external teeth 119 interferes with the inner periphery of the rotary case 112. For this reason, in the third embodiment, the tooth tip portions (portions indicated by virtual lines in FIG. 11) of the external teeth 119 are cut by a predetermined amount along a circle having the center of the externally toothed gear 118 as the center of curvature, such that interference of the external teeth 119 and the inner periphery of the rotary case 112 is prevented. Moreover, the interference may be prevented by cutting the inner periphery of the rotary case 112 between adjacent internal teeth (pins) 114 by a predetermined depth, instead of cutting the tooth tip portions of the external teeth 119.

The meeting point C is preferably positioned between the tooth bottom circle M passing the tooth bottoms of all the external teeth 119 and the outer end passing circle G. The reason is that, when the meeting point C is positioned between the pin circle P and the tooth bottom circle M, a part of the reaction force K extends in an approximately tangential direction with respect to the externally toothed gear 118, and, as a result, the reaction force K may cause bending deformation of the external teeth 119, but, as described above, if the meeting point C is positioned between the tooth bottom circle M and the outer end passing circle G, the above problem can be prevented.

As described above, if the tooth tip portions of the external teeth 119 are cut, only parts of the internal teeth (pins) 114 and the external teeth 119, herein, about three fourth are meshed with each other, and about a fourth of the internal teeth (pins) 114 do not come into contact with the external teeth 119 and are separated from the pin grooves 113. For this reason, in the third embodiment, insertion holes 131b, into which both end portions of the internal teeth (pins) 114 are inserted, are formed at an inner end surface of an outer race 131a of the bearing 131, such that the internal teeth (pins) 114 are prevented from being separated from the pin grooves 113. At this time, driving force of about 3/8 is transmitted from the external teeth 119 to the internal teeth (pins) 114.

The above-described insertion holes 131b constitute regulation means 143, which prevents the internal teeth (pins) 114 not coming into contact with the external teeth 119 from being separated from the pin grooves 113, as a whole. Moreover, as the above-described regulation means 143, instead of the insertion holes 131b, circumferential grooves that are formed at the inner end surface of the outer race 131a and have a width equal to the diameter of the internal teeth (pins) 114 may be used. Alternatively, one pin pressing ring that is interposed between the two externally toothed gears 118 and whose outer periphery comes into contact with all the internal teeth (pins) 114 may be used. In addition, two pin pressing rings that are interposed between the bearing 131 and the externally toothed gear 118 and have apertures or circumferential grooves, into which both end portions of the internal teeth (pins) 114 are inserted, may be used.

Next, the actions of the third embodiment of the invention will be described.

Now, the driving motor operates and the crank shafts 135 rotate around their center axes in the same direction at the same speed. At this time, eccentric rotation of the eccentric cams 138 of the crank shafts 135 in the crank shaft holes 121 of the externally toothed gear 118 causes eccentric oscillation and rotation of the externally toothed gear 118. Here, since the number of the external teeth 119 of the externally toothed gear 118 is less than the number of the internal teeth (pins) 114 by one, the rotary case 112 and the arm of the robot rotate at low speed due to the eccentric oscillation and rotation of the externally toothed gear 118.

Here, the meeting point C where the action lines S of the drive force components (the reaction force K) correspondingly given from the external teeth 119 of the externally toothed gear 118 to the internal teeth (pins) 114 is positioned between the pin circle P passing the centers of all the internal teeth (pins) 114 and the outer end passing circle G passing the radially outer ends of all the through holes 122. Accordingly, when the meeting point C is positioned on the radial line passing the center of the through hole 122, the action lines S of the reaction force K are inclined toward the tangential direction with respect to the through hole 122 compared with the related art, such that eccentric deformation of the bridge portions 118a and the external teeth 119 in the vicinity of the bridge portions 118a is suppressed.

In the third embodiment described above, a plurality (three) of crank shaft holes 121 are formed in the externally toothed gear 118, and the crank shafts 135 that rotate in the same direction at the same speed are respectively inserted into the crank shaft holes 121 so as to cause eccentric oscillation and rotation of the externally toothed gear 118. In the invention, however, one crank shaft may be inserted into one crank shaft hole formed on the central axis of the externally toothed gear 118, and the rotation of the crank shaft may cause eccentric oscillation and rotation of the externally toothed gear. In this case, the pillar portions of the support body need to be brought into linear contact with the inner peripheries of the through holes.

In the third embodiment described above, the support body 125 is fixed and the internally toothed gear 115 rotates at low speed. In the invention, however, the internally toothed gear may be fixed and the support body may rotate at low speed. In addition, in the invention, a spur gear speed reducer having a reduction ratio less than 1/7 (close to 1/1) may be provided at the front stage of the above-described planetary gear device 111 and the reduction may be performed at two stages. With this configuration, it is possible to obtain a high reduction ratio gear device having a high natural vibration frequency.

Fourth Embodiment

Hereinafter, a fourth embodiment of the invention will be described with reference to the drawings.

Figure 14:
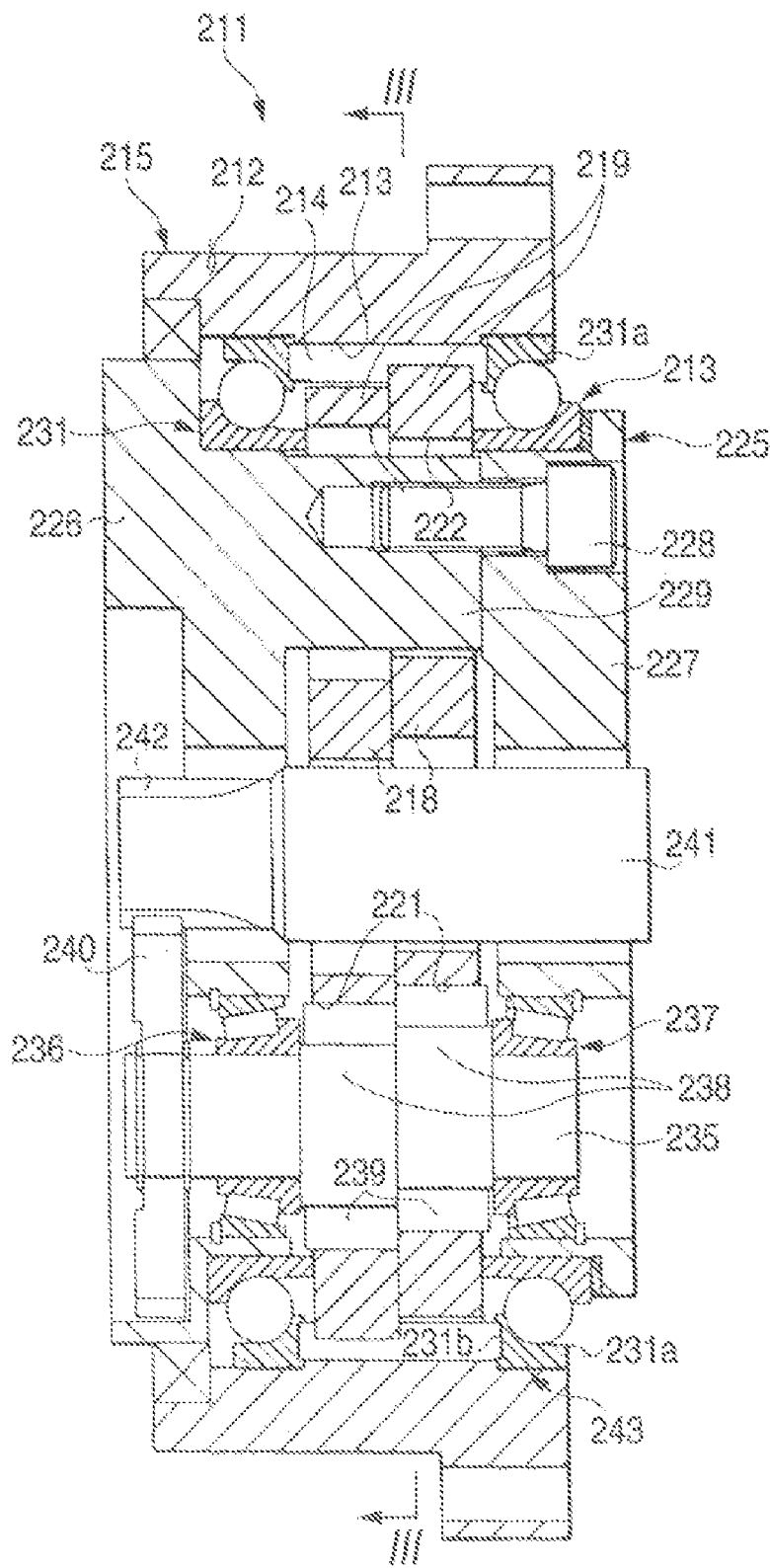
FIG. 14 is a side sectional view showing a fourth embodiment of the invention.
Figure 15:
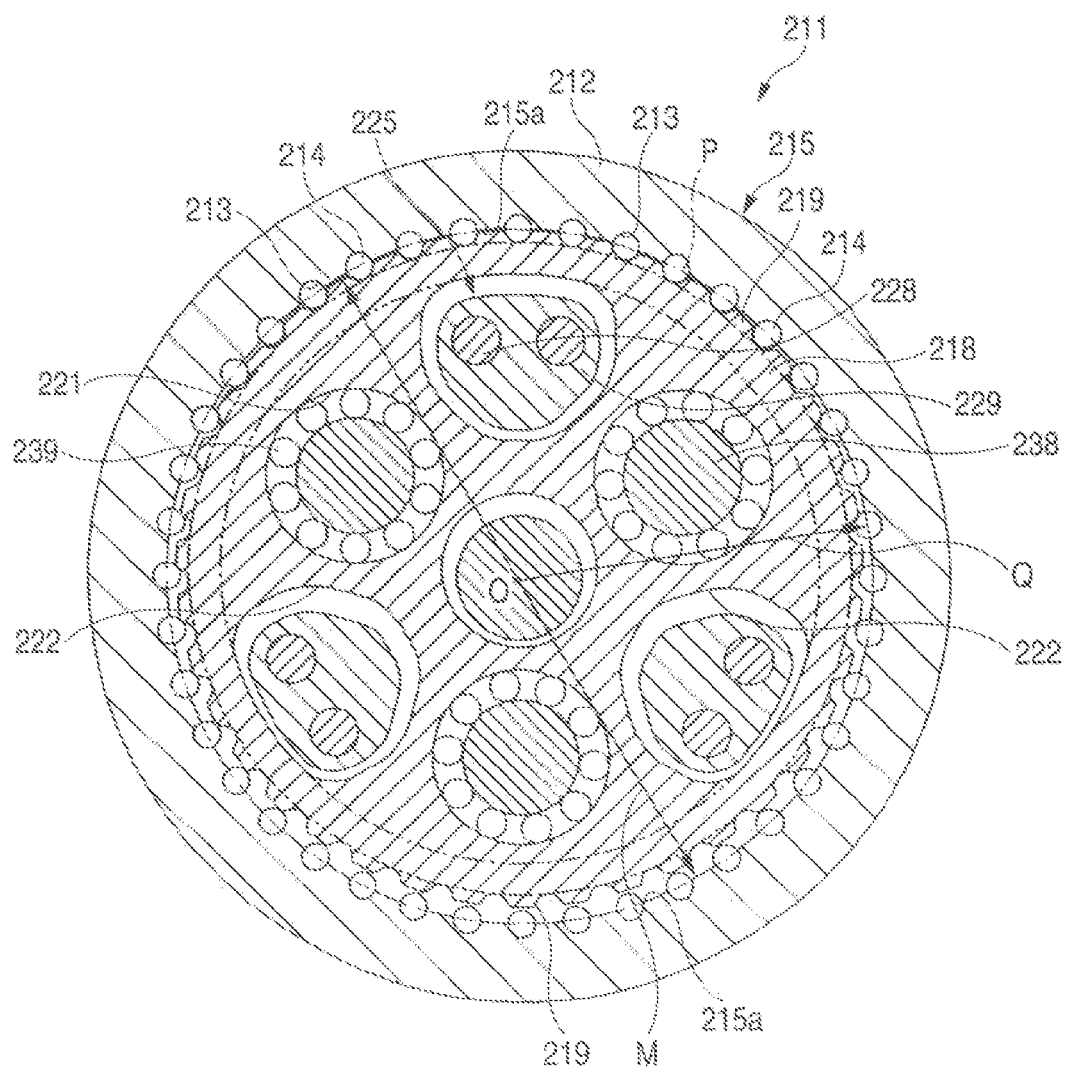
FIG. 15 is a cross-sectional view taken along the line III-III of FIG. 14.
Figure 16:
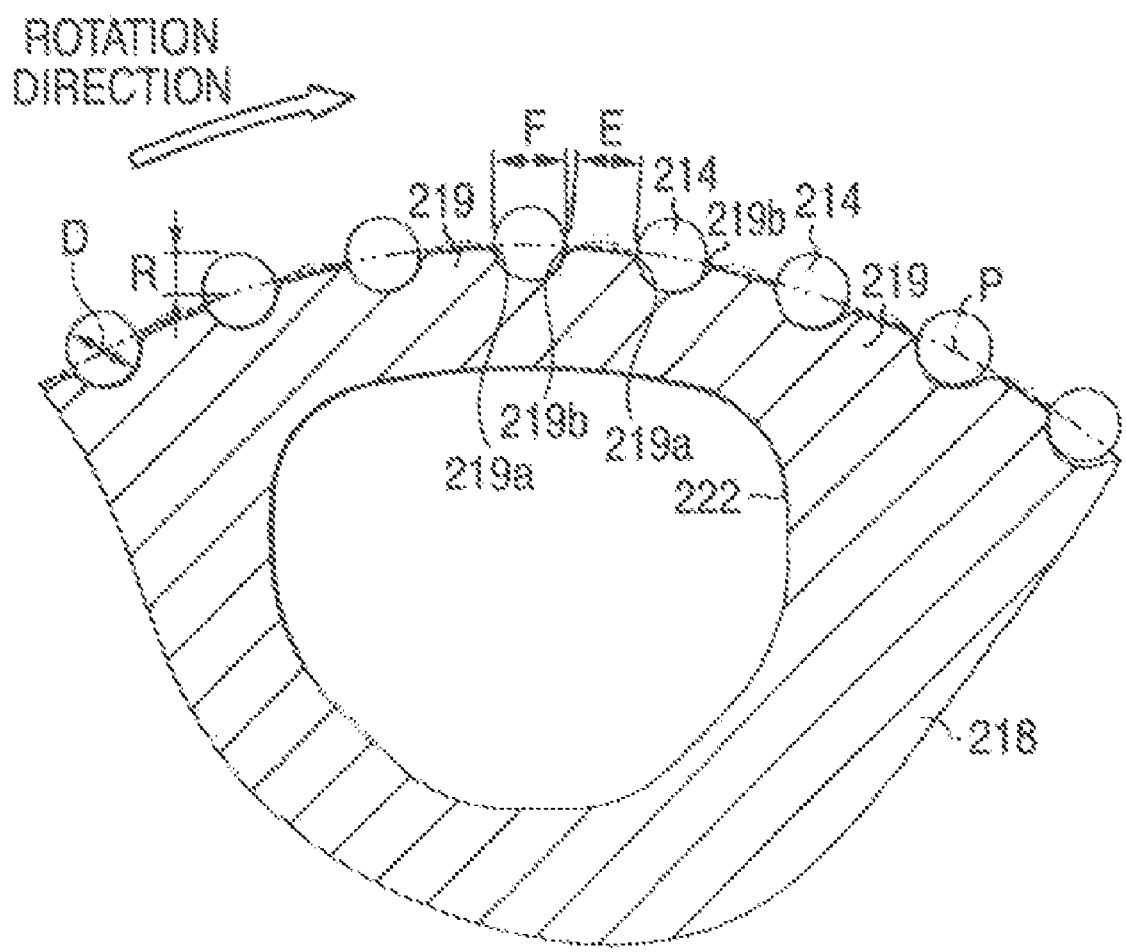
FIG. 16 is a cross-sectional view showing a state where internal teeth and external teeth are meshed with each other, which corresponds to FIG. 15.

In FIGS. 14, 15, and 16, reference numeral 211 denotes an eccentric oscillating-type planetary gear device that is used in a robot or the like. The planetary gear device 211 has an approximately cylindrical rotary case 212 that is mounted on an arm or hand of a robot (not shown). A plurality of pin grooves 213 having semicircle sectional shapes are formed at a central portion in an axial direction at an inner periphery of the rotary case 212. The pin grooves 213 extend in the axial direction and are arranged at constant distances in the circumferential direction.

Reference numeral 214 denotes internal teeth having a plurality of pillar pins (equal in number to the pin grooves 213). The internal teeth (pins) 214 are provided at constant distances on the inner periphery of the rotary case 212 in the circumferential direction, such that approximately halves of the internal teeth are inserted into the pin grooves 213. The rotary case 212 and the internal teeth (pins) 214 described above constitute an internally toothed gear 215 as a whole, in which the internal teeth 214 having a plurality of rod-shaped pins on the inner periphery 215a are provided. As a result, the inner periphery 215a of the internally toothed gear 215 (fixed case 212) is positioned on or in the vicinity of the pin circle P passing the centers of the pins constituting the all the internal teeth 214. Here, the number of the internal teeth (pins) 214 is about 25 to 100, and preferably, in a range of 30 to 80. The reason is that, if the number of the internal teeth (pins) 214 is set in the above-described range, a spur gear speed reducer having a reduction ratio of 1/1 to 1/7 is provided at a front stage of meshing of an externally toothed gear 218 and an internally toothed gear 215 described below so as to combine a reduction ratio of the front stage and a rear stage, it is possible to construct a high-reduction-ratio planetary gear device, in which a high reduction ratio can be easily obtained, and a natural vibration frequency is high.

A plurality (in this embodiment, two) of externally toothed gears 218 having ring shapes are arranged in an axial direction and accommodated in the internally toothed gear 215, and a plurality of external teeth 219 having a trochoid profile, specifically, a peritrochoid profile are formed on the outer periphery of the externally toothed gear 218. Then, the number of the external teeth 219 of the externally toothed gear 218 is less than the number of the internal teeth (pins) 214 by one (a difference in the number of teeth is one). The reason why the difference in the number of teeth between the internal teeth (pins) 214 and the external teeth 219 is one is that a high reduction ratio can be easily obtained and processing costs can be reduced compared with a case where the difference in the number of teeth is a value G of two or more.

The externally toothed gear in which the difference in the number of teeth is the value G of two or more refers to an externally toothed gear in which external contours of a trochoid, externally toothed gear are shifted in a circumferential direction by a distance obtained by dividing the pitch between the external teeth 219 by the value G, and overlap parts of G external contours shifted in the circumferential direction are extracted as a profile (see JP-A-3-181641). Then, the external teeth 219 and the internal teeth (pins) 214 are meshed with each other in a state where the externally toothed gear 218 and the internally toothed gear 215 internally come into contact with each other. However, the maximum meshing portions (those portions where the depth of meshing is the largest) of the two externally toothed gears 218 are 180 degrees out of phase with each other.

At least one, in this embodiment, three crank shaft holes 221 are formed through each of the externally toothed gears 218 in the circumferential direction. The plurality of crank shaft holes 221 are arranged from the central axis of the externally toothed gear 218 at constant distances in a radial direction and arranged at constant distances in the circumferential direction. Reference numeral 222 denotes a plurality (equal in number to the crank shaft holes 221, that is, three) of through holes formed in each of the externally toothed gear 218. The through holes 222 and the crank shaft holes 221 are arranged alternatively in the circumferential direction and are arranged at constant distances in the circumferential direction. Then, the through holes 222 have base shapes having a circumferential width is widened radially outward.

Reference numeral 225 denotes a support body (carrier) loosely fitted into a rotary case 212 and mounted on a fixed robot member (not shown). The support body 225 has a pair of approximately ring-shaped end plate portions 226 and 227 respectively facing axial outer surfaces of the externally toothed gears 218, and a plurality (equal in number to the through holes 222, that is, three) of pillar portions 229 that are integrally connected at their one ends to the end plate portion 226 and are detachably connected at the other ends to the end plate portion 227 by a plurality of bolts 228. The pillar portions 229 that interconnect the end plate portions 226 and 227, extend in the axial direction, and are inserted (loosely fitted) into the respective through holes 222 of the externally toothed gears 218 while holding at a slight gap.

Reference numeral 231 denotes a pair of bearings interposed between the support body 225 and the rotary case 212, and specifically, between the outer peripheries of the end plate portions 226 and 227 and the inner periphery of both axial end portions of the rotary case 212. With the bearings 231, the internally toothed gear 215 is rotatably supported on the support body 225. Reference numeral 235 denotes at least one crank shaft (equal in number to the crank shaft holes 221, that is, three) arranged at constant angles in the circumferential direction. The plurality of crank shafts 235 are rotatably supported on the support body 225 and more specifically on the end plate portions 226 and 227 by a conical bearing 236 externally fitted on one axial end portion and a conical bearing 237 externally fitted on the other axial end portion.

The crank shaft 235 has two eccentric cams 238 that are formed on its axially central portion and offset a constant distance from the central axis thereof. The two eccentric cams 238 are 180 degrees out of phase with each other. The eccentric cams 238 of the shaft 235 are loosely fitted into the crank shaft holes 221 of the externally toothed gear 218, respectively, and a needle bearing 239 is interposed between the eccentric cams 238. As a result, relative rotation of the externally toothed gear 218 and the crank shaft 235 is allowed. Further, an external gear 240 is fixed at one axial end of each of the crank shafts 235 and an external gear 242 provided at one end of an output shaft 241 of a driving motor (not shown) is meshed with the external gear 240.

Figure 17:
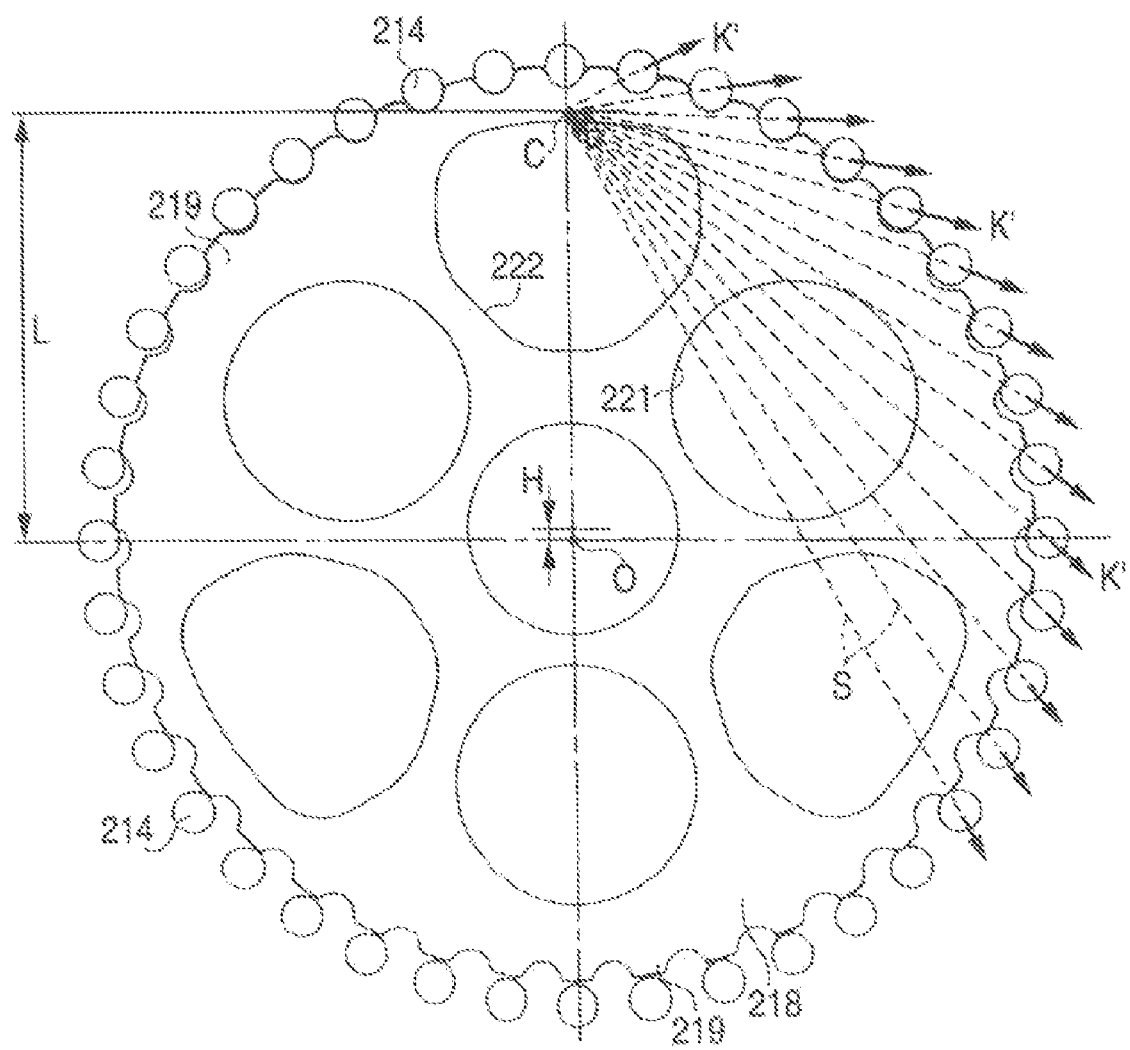
FIG. 17 is an explanatory view showing drive force components K' given to internal teeth and action lines S.

Then, if the driving motor operates and the external gear 240 rotates, the crank shaft 235 rotates around its central axis, which causes eccentric rotation of the eccentric cams 238 of the crank shaft 235 in the crank shaft holes 221 of the externally toothed gear 218 and eccentric rotation and oscillation of the externally toothed gear 218 in an arrow direction. At this time, at contact points where the internal teeth (pins) 214 and the external teeth 219 are meshed with each other, as shown in FIG. 17, drive force components K' in directions of action lines S are correspondingly given from the external teeth 219 to the internal teeth (pins) 214.

Here, the action lines S of the reaction force K' of the drive force components described above are positioned on lines perpendicular to the tooth surfaces at the contact points. As described above, since the internal teeth (pins) 214 have rod shapes and the external teeth 219 have a trochoid profile, the plurality of action lines S meet (cross) at one point on the externally toothed gear 218, that is, at a meeting point C. Then, output torque output from the internally toothed gear 215 of such a planetary gear device 211 to the arm of the robot or the like becomes the sum of values obtained by multiplying the tangential components of the drive force components K' at the individual contact points of the external teeth 219 and the internal teeth (pins) 214 by the distance from the center O of the internally toothed gear 215 to the contact point.

In this embodiment, in order to increase the above-described output torque, the amount H of eccentricity of the externally toothed gear 218 with respect to the internally toothed gear 15 of the external is set to be equal to or more than 0.5 times the radius R of each of the pins constituting the internal teeth 214 beyond the limit in the related art. As such, if the amount H of eccentricity is equal to or more than the 0.5 times the radius R, the radial distance L from the center O of the internally toothed gear 215 to the meeting point C (obtained by multiplying the amount H of eccentricity by the number Z of the internal teeth (pins) 214) can be made larger compared with the related art, that is, the position of the meeting point C can be significantly moved radially outward.

Accordingly, the action lines S are significantly inclined toward the tangential direction with respect to the externally toothed gear 218 compared with the related art, and thus the tangential components of the drive force components K' are increased. As a result, when the number of meshing teeth of the internal and external teeth 214 and 219 is not changed, the output torque increases. However, when the amount H of eccentricity exceeds 1.0 times the radius R, a rotation position where the external teeth 219 and the internal teeth (pins) 214 interfere with each other upon eccentric oscillation and rotation of the externally toothed gear 218. Therefore, the amount H of eccentricity needs to be in a range of 0.5 to 1.0 times the radius R.

As described above, when the radial distance from the center O of the internally toothed gear 215 to the meeting point C (obtained by multiplying the amount H of eccentricity by the number Z of the internal teeth (pins) 214) is L, and the radius of the pin circle P passing the centers of all the pins constituting the internal teeth 214 is Q, the value of the ratio L/Q is preferably in a range of 0.86 to 1.00.

Figure 18:
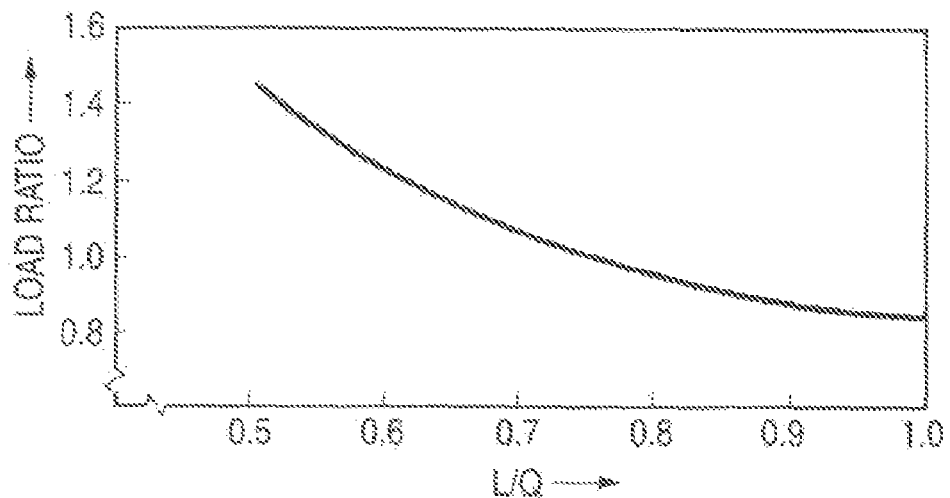
FIG. 18 is a graph showing the relationship between an L/Q value and a load ratio.

The reason is that, if the value of the ratio L/Q is equal to or more than 0.86, as will be apparent from FIG. 18, since the load ratio is almost constant and the same torque is obtained, the load relative to torque transmission applied to the external teeth 219 is almost constant and becomes the minimum, but, if the value of the ratio L/Q is less than 0.86, a change of the load ratio is made larger, and the load relative to torque transmission applied to the external teeth 219 is increased. Meanwhile, if the value of the ratio L/Q exceeds 1.00, pointed portions may occur at the tooth surfaces upon creation of the external teeth 219.

The above-described graph is obtained by performing a simulation under the following conditions. That is, the number Z of the internal teeth (pins) of each planetary gear device is 40, the diameter D of the internal teeth (pins) is 10 mm, the radius Q of the pin circle P is 120 mm, and the number of the external teeth is 39. The values are fixed. Meanwhile, while the value of the ratio L/Q changes in a range of 0.5 to 1.0, the tangential components of resultant force obtained by synthesizing the device force components K' applied to the meeting point C are calculated. Here, in FIG. 18, the tangential component when the value of the ratio L/Q is 0.75 is represented by a graph with the load ratio as the index 1.

As described above, when the value of the ratio L/Q is in a range of 0.86 to 1.00, the diameter D (the radius R×2) of each of the internal teeth (pins) 214 is preferably a value obtained by dividing the diameter M (the radius Q×2) of the pin circle P by the number U of the external teeth 219, that is, in the vicinity of M/U, and specifically, in a range of M/U±2 mm. The reason is that, if the diameter D is in the vicinity of the value M/U, as will be apparent from a graph shown in FIG. 19, Hertz stress at the contact points of the internal teeth (pins) 214 and the external teeth 219 can be kept as a low value inside a point where a rapid increase starts, and the life of the external teeth 219 can extend.

Figure 19:
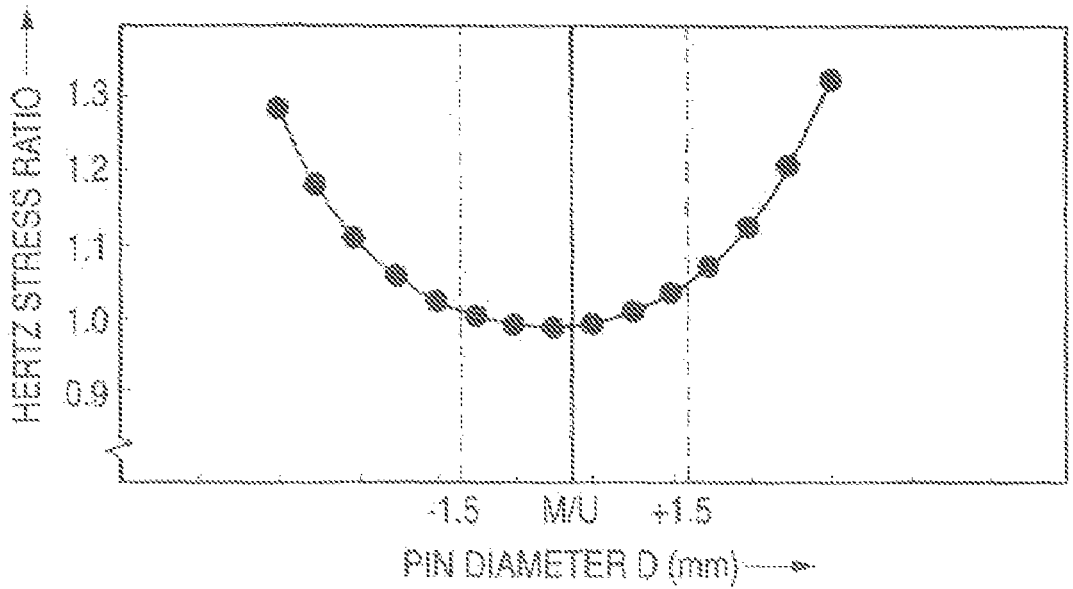
FIG. 19 is a graph showing the relationship between the diameter D of internal teeth (pins) and a Hertz stress ratio.

In order to make the Hertz stress the almost constant minimum value, the diameter D is more preferably in a range of M/U±0.75 mm, as will be apparent from FIG. 19. Moreover, the graph shown in FIG. 19 is also obtained by performing a simulation under the same conditions as the graph of FIG. 18, except that the amount H of eccentricity is 2.7 mm, while changing the diameter D of the internal teeth (pins) 14, and by calculating the Hertz stress at the contact points of the external teeth 19 and the internal teeth (pins) 14. The Hertz stress value when the diameter D is equal to M/U is represented as the index 1.

As described above, if the amount H of eccentricity is equal to or more than 0.5 times the radius R, the external teeth 219 whose both tooth surfaces come into contact with the internal teeth (pins) 214 are made larger, that is, the thickness and the length thereof are made larger. Accordingly, the external teeth 219 exceed and enter the inner periphery 215a of the internally toothed gear 215 (the rotary case 12) positioned almost on the pin circle P, and interference occurs between them. For this reason, in the fourth embodiment, the external teeth 219 are cut from the tooth tops by a predetermined amount (by portions indicated by virtual lines in FIG. 16) along a circle with the center of the externally toothed gear 218 as the center of curvature, such that the interference of the external teeth 219 and the inner periphery 215a of the internally toothed gear 215 is prevented. Moreover, the cut amount in the external teeth 219 is preferably such an extent that a slight gap occurs between each of the front ends of the external teeth 219 after cutting and the inner periphery 15a of the internally toothed gear 215 at the maximum mashing portion of the internally toothed gear 215 and the externally toothed gear 218.

As described above, in a case where the external teeth 219 are partially cut, when a distance between a rotation direction front edge 219a and a rotation direction rear edge 219b in one external tooth 219 is E and a distance between the rotation direction front edge 219a and the rotation direction rear edge 219b in two adjacent external teeth 219 is F, the distance E is preferably larger than the distance F. The reason is that, with this configuration, bending rigidity of the external teeth 219 increases, and processing of the external teeth can be easily performed.

As described above, if the external teeth 219 are cut from the tooth tops by the predetermined amount, only parts of the internal teeth (pins) 214 and the external teeth 219, for example, about a third even though the value of the ratio L/Q is 1.0, are meshed. In the fourth embodiment, about three fourth are meshed with each other, and a fourth of the internal teeth (pins) 214 do not come into contact with the external teeth 219 and are separated from the pin grooves 213. For this reason, in the fourth embodiment, insertion holes 231b, into which both end portions of the internal teeth (pins) 214 are inserted, are formed at the inner end surface of an outer race 231a of the bearing 231, such that the internal teeth (pins) 214 are prevented from being separated from the pin grooves 213. At this time, driving force of about 3/8 is transmitted from the external teeth 219 to the internal teeth (pins) 214.

The above-described insertion holes 231b constitute regulation means 243, which prevents the internal teeth (pins) 214 not coming into contact with the external teeth 219 from being separated from the pin grooves 213, as a whole. Moreover, as the above-described regulation means 243, instead of the insertion holes 231b, circumferential grooves that are formed at the inner end surface of the outer race 231a and have a width equal to the diameter of the internal teeth (pins) 214 may be used. Alternatively, one pin pressing ring that is interposed between the two externally toothed gears 218 and whose outer periphery comes into contact with all the internal teeth (pins) 214 may be used.

Next, the actions of the fourth embodiment of the invention will be described.

Now, the driving motor operates and the crank shafts 235 rotate around their center axes in the same direction at the same speed. At this time, eccentric rotation of the eccentric cams 238 of the crank shafts 235 in the crank shaft holes 221 of the externally toothed gear 218 causes eccentric oscillation and rotation of the externally toothed gear 218. Here, since the number of the external teeth 219 of the externally toothed gear 218 is less than the number of the internal teeth (pins)

214 by one, the rotary case 212 and the arm of the robot rotate at low speed due to the eccentric oscillation and rotation of the externally toothed gear 218.

As described, if the amount H of eccentric is equal to or more than 0.5 times the radius R, the distance L from the center O of the internally toothed gear 215 to the meeting point C can be made larger compared with the related art, that is, the position of the meeting point C can be more moved radially outward. Accordingly, the action lines S are significantly inclined toward the tangential direction with respect to the externally toothed gear 218 compared with the related art. Therefore, the tangential components of the drive force components K' increase, and the output torque increases.

Fifth Embodiment

Figure 20:
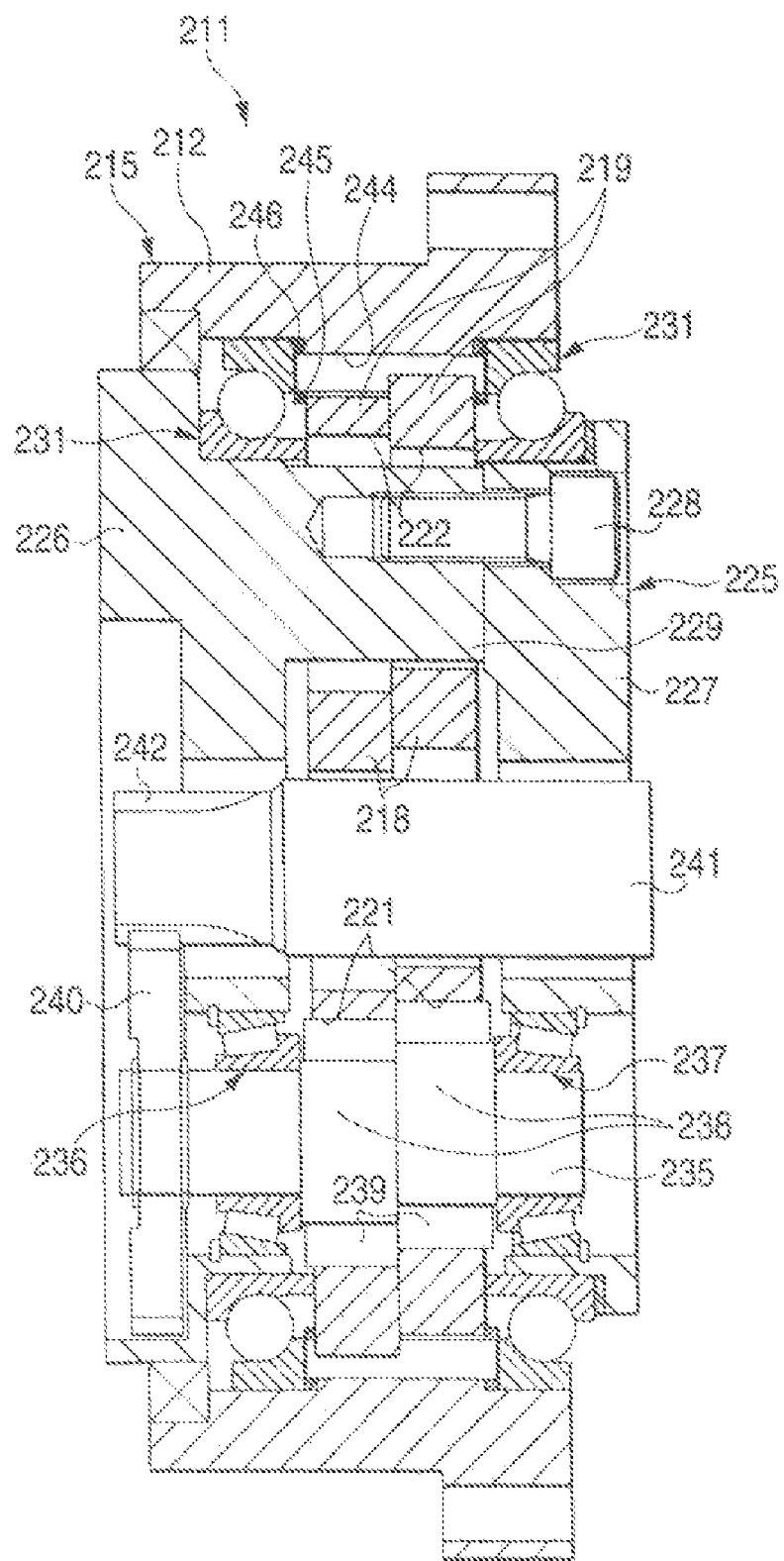
FIG. 20 is a cross-sectional view showing a fifth embodiment of the invention, which corresponds to FIG. 14.
Figure 21:
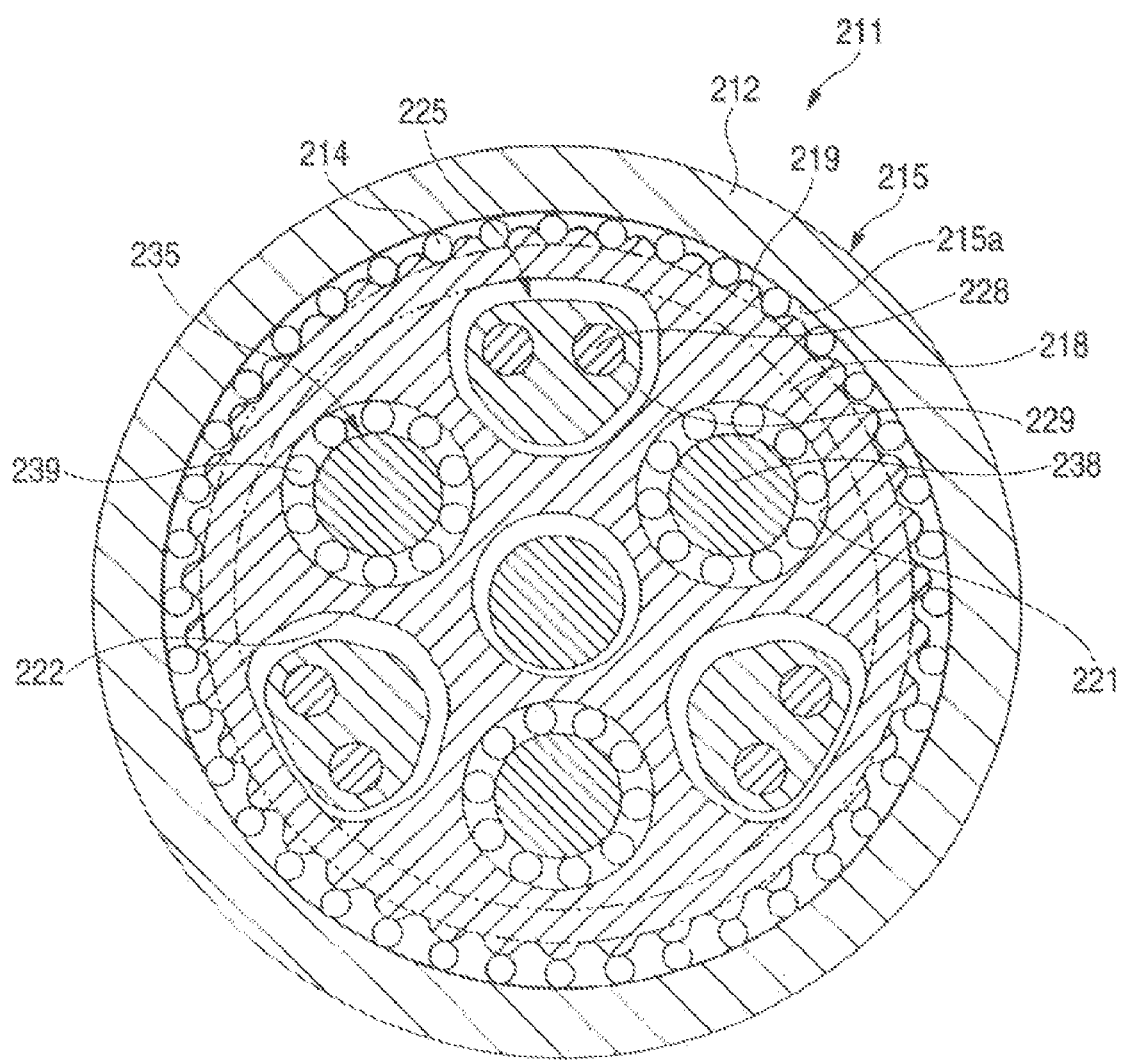
FIG. 21 is a cross-sectional view showing the fifth embodiment of the invention, which corresponds to FIG. 15.
Figure 22:
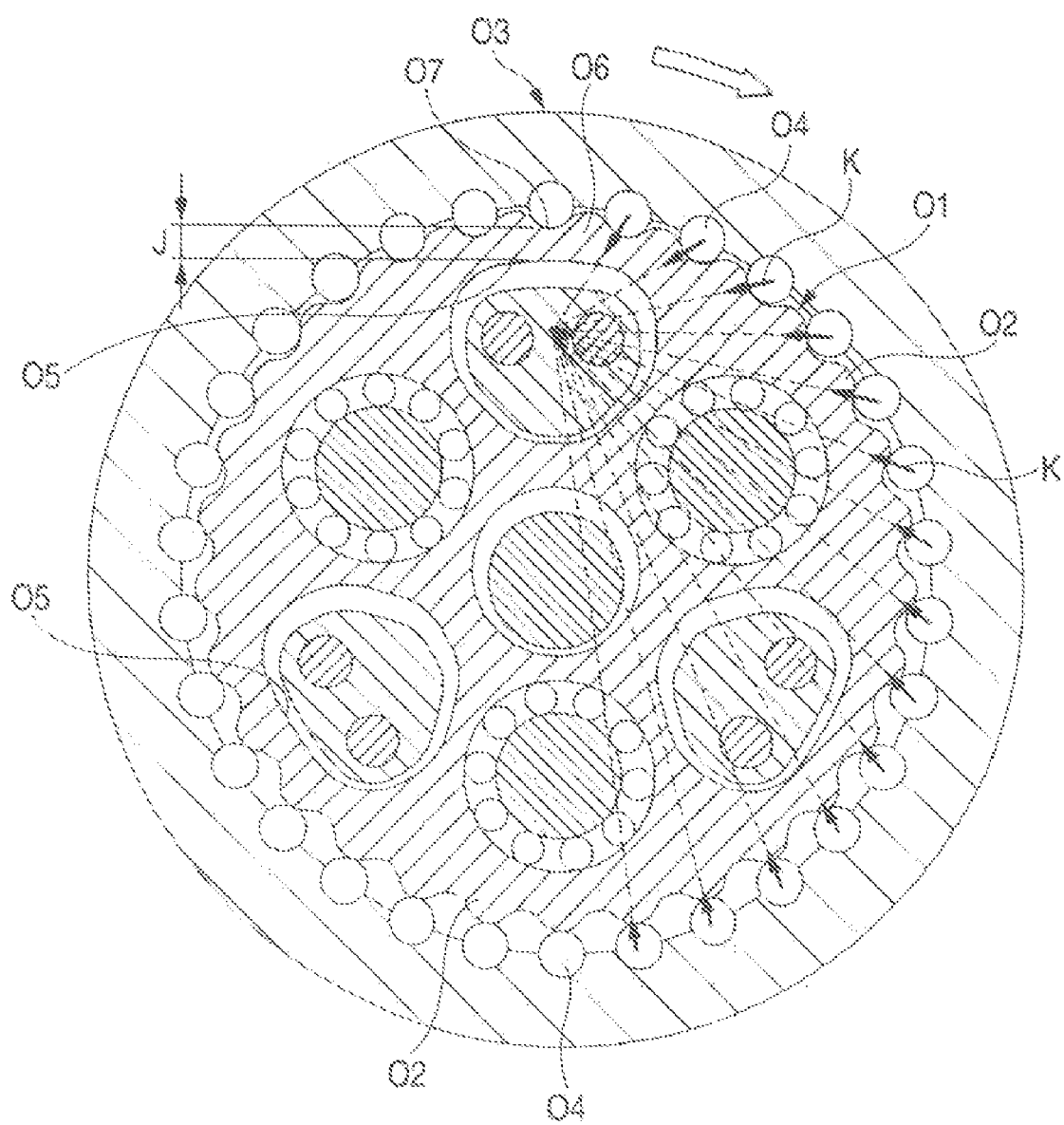
FIG. 22 is a cross-sectional view showing an example of the background art, which corresponds to FIG. 2.

FIGS. 20 and 21 show a fifth embodiment of the invention. In the fifth embodiment, unlike the fourth embodiment, cutting of the external teeth 219 is not performed, but the periphery 215a of the internally toothed gear 215 (the rotary case 212) between adjacent internal teeth (pins) 214 and the periphery 215a in the vicinity of each of the internal teeth (pins) 214 are cut by a predetermined depth, in this embodiment, by a depth almost equal to the radius R of each of the internal teeth (pins) 214, such that interference of the external teeth 219 and the inner periphery 215a of the internally toothed gear 215 (the rotary case 212) is prevented. Here, the cut amount of the inner periphery 215a may be appropriately determined according to the entering amount of the external teeth 219.

As a result, the radially outer ends of the internal teeth (pins) 214 come into linear contact with the inner periphery 215a of the internally toothed gear 215 after cutting, and thus the radial components of the drive force components K' given to the individual internal teeth (pins) 214 are received by the rotary case 212. At this time, since the pin grooves 213 do not exist, the internal teeth (pins) 214 can be freely moved. For this reason, in the fifth embodiment, two pin pressing rings 246 serving as regulation means, in which insertion holes 245 are formed are interposed between the bearing 231 and the externally toothed gear 218. Both end portions of each of the internal teeth (pins) 214 are inserted into the insertion holes 245. In addition, the two pin pressing rings 246 are unrotatably fixed in the internally toothed gear 215 so as to regulate the movement of the above-described internal teeth (pins) 214. Moreover, other parts and actions are the same as the fourth embodiment.

Moreover, in the fourth embodiment described above, the plurality (three) of crank shaft holes 221 are formed in the externally toothed gear 218, and the crank shafts 235, which rotate in the same direction at constant speed, are respectively inserted into the crank shaft holes 221 so as to cause eccentric oscillation and rotation of the externally toothed gear 218. In the invention, however, one crank shaft may be inserted into one crank shaft hole formed on the central axis of the externally toothed gear 218, and the rotation of the crank shaft may cause eccentric oscillation and rotation of the externally toothed gear. In this case, the pillar portions of the support body need to be brought into linear contact with the inner peripheries of the through holes.

In the fourth embodiment described above, the support body 225 is fixed and the internally toothed gear 215 rotates at low speed. In the invention, however, the internally toothed gear may be fixed and the support body may rotate at low speed. In addition, in the invention, a spur gear speed reducer having a reduction ratio less than 1/7 (close to 1/1) may be provided at the front stage of the above-described planetary gear device 211 and the reduction may be performed at two stages. With this configuration, it is possible to obtain a high reduction ratio gear device having a high natural vibration frequency. Further, in the fourth embodiment described above, the external teeth 219 are cut from the tooth tops by the predetermined amount, and, in the fifth embodiment, the inner periphery 215a of the internally toothed gear 215 (the rotary case 212) between the internal teeth (pins) 214 are cut by the predetermined depth. In the invention, however, both the external teeth and the inner periphery of the internally toothed gear may be cut.

The invention can be applied to an eccentric oscillating-type planetary gear device that allows eccentric oscillation of an externally toothed gear meshed with an internally toothed gear by a crank shaft.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An eccentric oscillating-type planetary gear device comprising:
    an internally toothed gear, in which internal teeth having a plurality of rod-shaped pins on an inner periphery are provided by a constant pitch P;
    an externally toothed gear, in which at least one crank shaft hole and a plurality of through holes are formed and which has external teeth meshed with the internal teeth on an outer periphery, the external teeth having a trochoid tooth profile and being less than the internal teeth by one;
    a crank shaft that is inserted into the crank shaft hole and rotates to cause eccentric oscillation of the externally toothed gear; and
    a support body that rotatably supports the crank shaft and has a plurality of pillar portions respectively loosely fitted into the through holes,
    wherein a ratio obtained by dividing the diameter D of each of the pins constituting the internal teeth by the constant pitch P of the internal teeth is made smaller to an extent where tooth tops of the external teeth are radially outside the inner periphery of the internally toothed gear, and
    portions of the external teeth that exceed at least the inner periphery of the internally toothed gear are cut, such that interference of the external teeth and the inner periphery of the internally toothed gear is prevented.

2. The eccentric oscillating-type planetary gear device according to claim 1, wherein, when the radius of the pin circle V passing the centers of all the pins constituting the internal teeth is R and a radial distance from the center O of the internally toothed gear to a meeting point C where action lines S of reaction force K of drive force components correspondingly given from the external teeth to the internal teeth meet is L, the radial distance L is in a range of 0.86 to 1.00 times the radius R.

3. The eccentric oscillating-type planetary gear device according to claim 1, wherein, when a distance between a rotation direction front edge and a rotation direction rear edge after the external teeth are cut by a line M connecting inflection points of both tooth surfaces is F and a distance between a rotation direction front edge and a rotation direction rear edge of the external teeth after the external teeth are cut by a border N between a tooth tip portion and a tooth toe portion, by cutting the external teeth outside the line M and radially inside the border N the diameter D of each of the pins constituting the internal teeth is set equal to or more than a value obtained by subtracting the distance F from an inter-center linear distance Y of the pins constituting the internal teeth and equal to or less than a value obtained by subtracting the distance E from the inter-center linear distance Y.

4. The eccentric oscillating-type planetary gear device according to claim 1, wherein, when the radius of the pin circle V passing the centers of all the pins constituting the internal teeth is R and the number of the external teeth of the externally toothed gear Z, the diameter D of each of the pins constituting the internal teeth is in a range of $2R/Z \pm 1.5$ mm.

5. An eccentric oscillating-type planetary gear device comprising:
- an internally toothed gear, in which internal teeth having a plurality of rod-shaped pins on an inner periphery are provided by a constant pitch P;
- an externally toothed gear, in which at least one crank shaft hole and a plurality of through holes are formed and which has external teeth meshed with the internal teeth on an outer periphery, the external teeth having a trochoid tooth profile and being less than the internal teeth by one;
- a crank shaft that is inserted into the crank shaft hole and rotates to cause eccentric oscillation of the externally toothed gear; and
- a support body that rotatably supports the crank shaft and has a plurality of pillar portions respectively loosely fitted into the through holes,
- wherein a ratio obtained by dividing a diameter D of each of the pins constituting the internal teeth by the constant pitch P of the internal teeth is made smaller to an extent where tooth tops of the external teeth are radially outside the inner periphery of the internally toothed gear, and
- the inner periphery of the internally toothed gear between adjacent internal teeth is cut by a depth equal to or more than the amount of the external teeth exceeding the inner periphery, such that interference of the external teeth and the inner periphery of the internally toothed gear is prevented.

6. An eccentric oscillating-type planetary gear device comprising:
- an internally toothed gear, in which internal teeth having a plurality of rod-shaped pins on an inner periphery are provided;
- an externally toothed gear, in which at least one crank shaft hole and a plurality of through holes are formed and which has a plurality of external teeth meshed with the internal teeth on an outer periphery, the external teeth having a trochoid tooth profile;
- a crank shaft that is inserted into the crank shaft hole and rotates to cause eccentric oscillation of the externally toothed gear; and
- a support body that rotatably supports the crank shaft and has a plurality of pillar portions respectively loosely fitted into the through holes,
- wherein a meeting point C where actions lines S of reaction force K of drive force components correspondingly given from the external teeth to the internal teeth meet is positioned between a pin circle P passing the centers of all the pins constituting the internal teeth and an outer end passing circle G passing radially outer ends of all the through holes.

7. The eccentric oscillating-type planetary gear device according to claim 6, wherein the meeting point C is positioned between a tooth bottom circle M passing tooth bottoms of all the external teeth and the outer end passing circle G.

8. The eccentric oscillating-type planetary gear device according to claim 7, wherein the number of the external teeth is less than the number of the internal teeth by one.

9. An eccentric oscillating-type planetary gear device comprising:
- an internally toothed gear, in which internal teeth having a plurality of rod-shaped pins on an inner periphery are provided;
- an externally toothed gear, in which at least one crank shaft hole and a plurality of through holes are formed and which has external teeth meshed with the internal teeth on an outer periphery, the external teeth having a trochoid tooth profile and the number of the external teeth being less than the number the internal teeth by one;
- a crank shaft that is inserted into the crank shaft hole and rotates to cause eccentric oscillation of the externally toothed gear; and
- a support body that rotatably supports the crank shaft and has a plurality of pillar portions respectively loosely fitted into the through holes,
- wherein, when an amount of eccentricity of the externally toothed gear to the internally toothed gear is H and the radius of each of the pins constituting the internal teeth is R, the amount of eccentricity H is in a range of 0.5 to 1.0 times the radius R, and
- the external teeth are cut from the tooth tops by a predetermined amount, such that interference of the external teeth and the internal teeth of the internally toothed gear is prevented.

10. The eccentric oscillating-type planetary gear device according to claim 9, wherein, a distance between a rotation direction front edge and a rotation direction rear edge at any one external tooth after cutting is E and a distance between a rotation direction front edge and a rotation direction rear edge at two adjacent external teeth is F, the distance E is set larger than the distance F.

11. The eccentric oscillating-type planetary gear device according to claim 9, wherein, when the radius of a pin circle P passing the centers of all the pins constituting the internal teeth is Q and a radial distance from the center O of the internally toothed gear to a meeting point C where action lines S of reaction force K correspondingly given from the external teeth to the internal teeth meet is L, the radial distance L is in a range of 0.86 to 1.00 times the radius Q.

12. An eccentric oscillating-type planetary gear device comprising:
- an internally toothed gear, in which internal teeth having a plurality of rod-shaped pins on an inner periphery are provided;
- an externally toothed gear, in which at least one crank shaft hole and a plurality of through holes are formed and which has external teeth meshed with the internal teeth on an outer periphery, the external teeth having a trochoid tooth profile and the number of the external teeth being less than the number the internal teeth by one;
- a crank shaft that is inserted into the crank shaft hole and rotates to cause eccentric oscillation of the externally toothed gear; and
- a support body that rotatably supports the crank shaft and has a plurality of pillar portions respectively loosely fitted into the through holes,
- when the amount of eccentricity of the externally toothed gear to the internally toothed gear is H and the radius of each of the pins constituting the internal teeth is R, the amount of eccentricity H is in a range of 0.5 to 1.0 times of the radius R, and
- the inner periphery of the internally toothed gear between adjacent internal teeth is cut by a predetermined depth, such that interference of the external teeth and the internal teeth of the internally toothed gear is prevented.

* * * * *